Dec. 29, 1970     J. S. RANDALL ET AL     3,550,487
MACHINE TOOL
Original Filed May 22, 1967     8 Sheets-Sheet 2
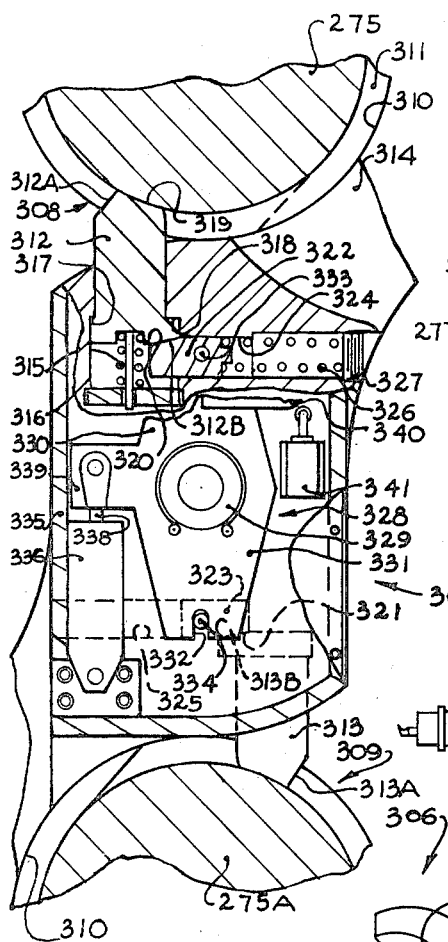
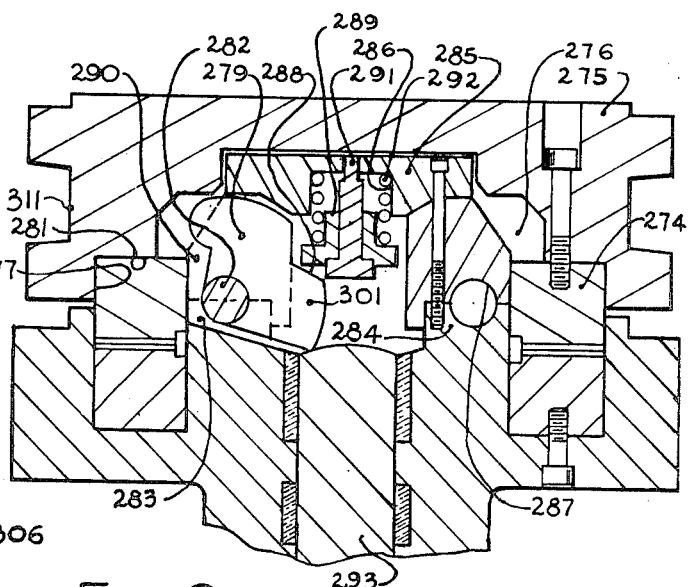
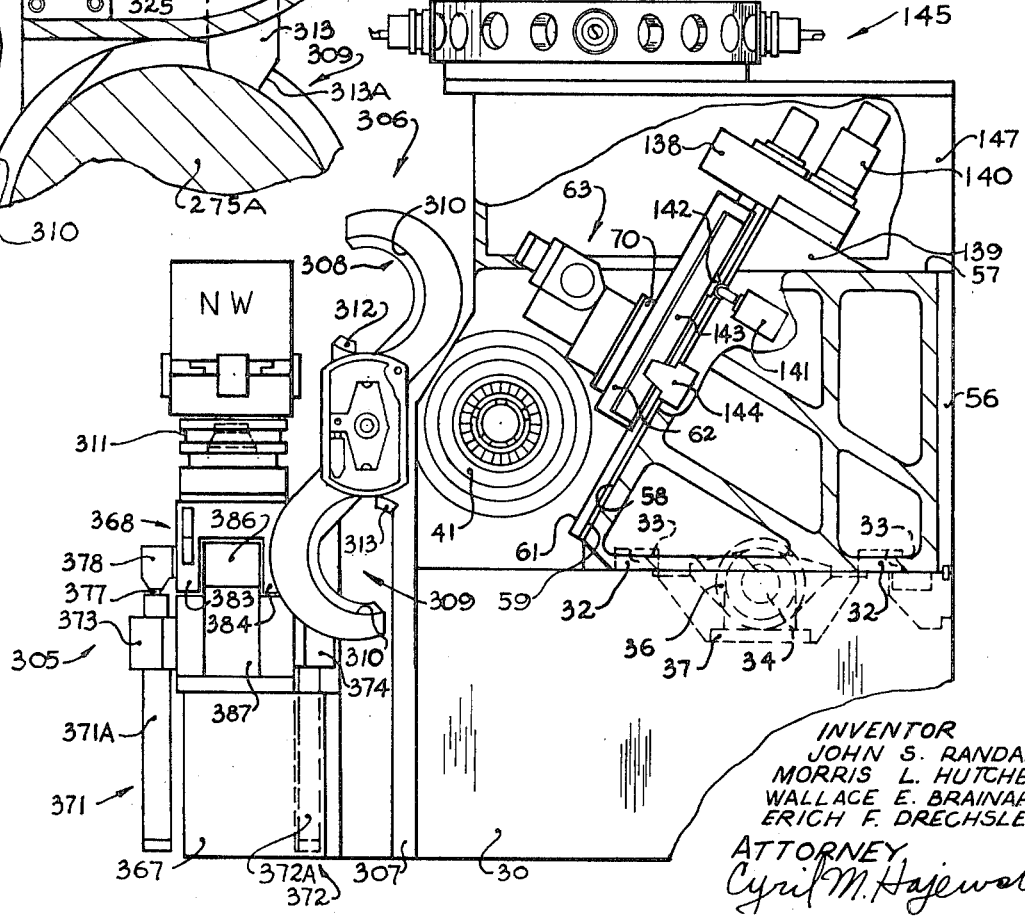
INVENTOR
JOHN S. RANDALL
MORRIS L. HUTCHENS
WALLACE E. BRAINARD
ERICH F. DRECHSLER
ATTORNEY
Cyril M. Hajewski Dec. 29, 1970     J. S. RANDALL ET AL     3,550,487
MACHINE TOOL
Original Filed May 22, 1967     8 Sheets-Sheet 3
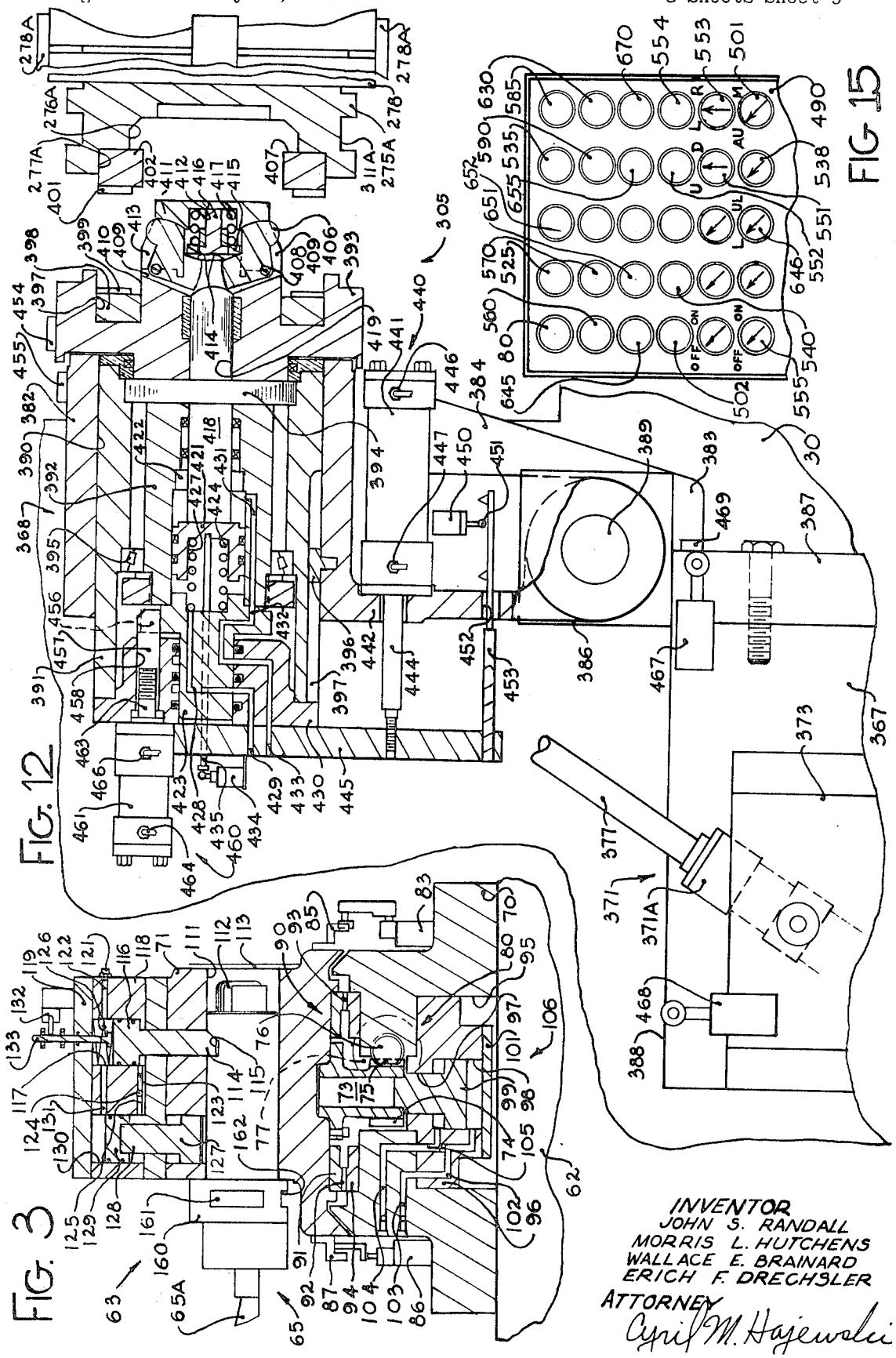
*INVENTOR*
*JOHN S. RANDALL*
*MORRIS L. HUTCHENS*
*WALLACE E. BRAINARD*
*ERICH F. DRECHSLER*
ATTORNEY

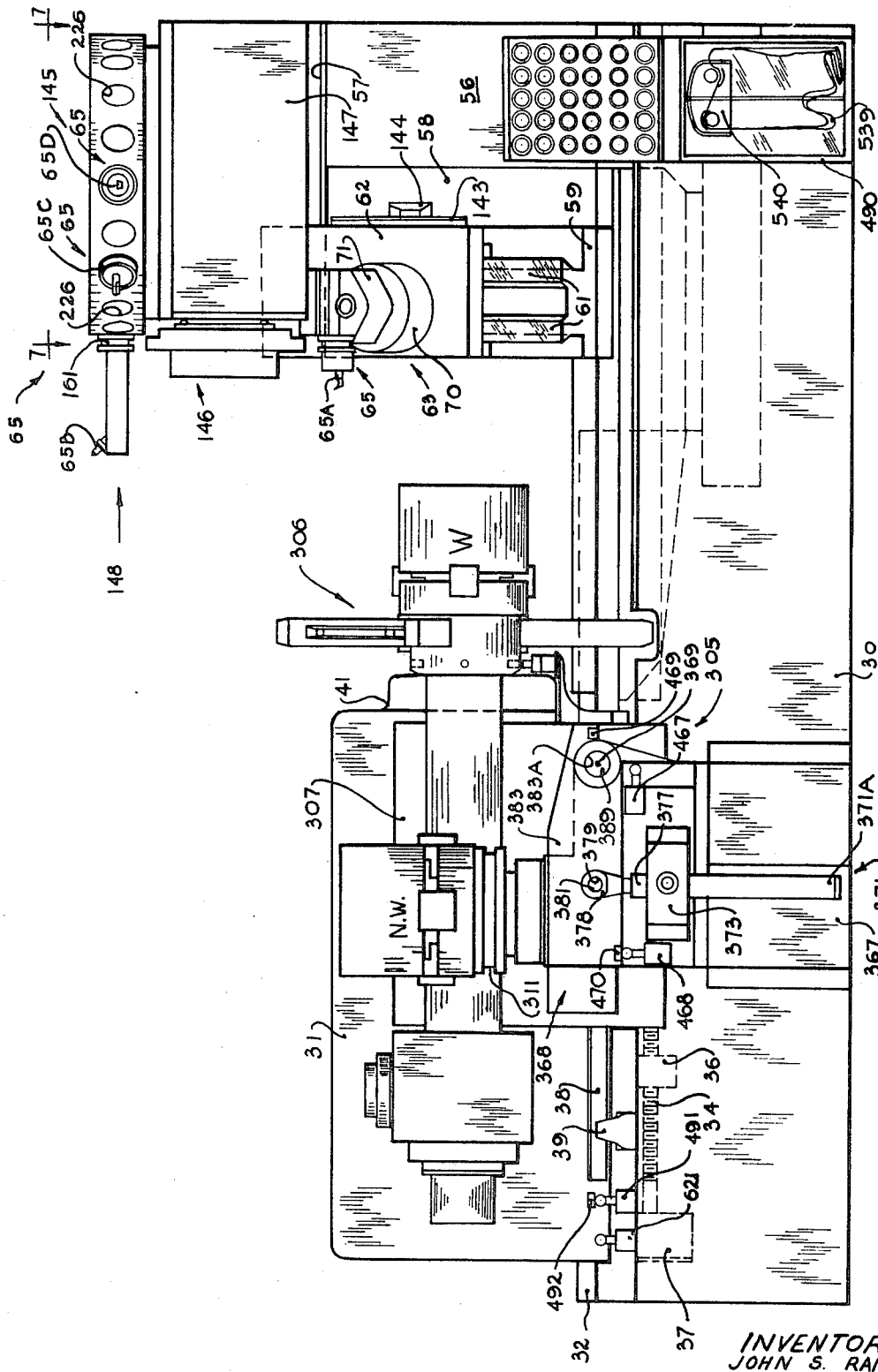

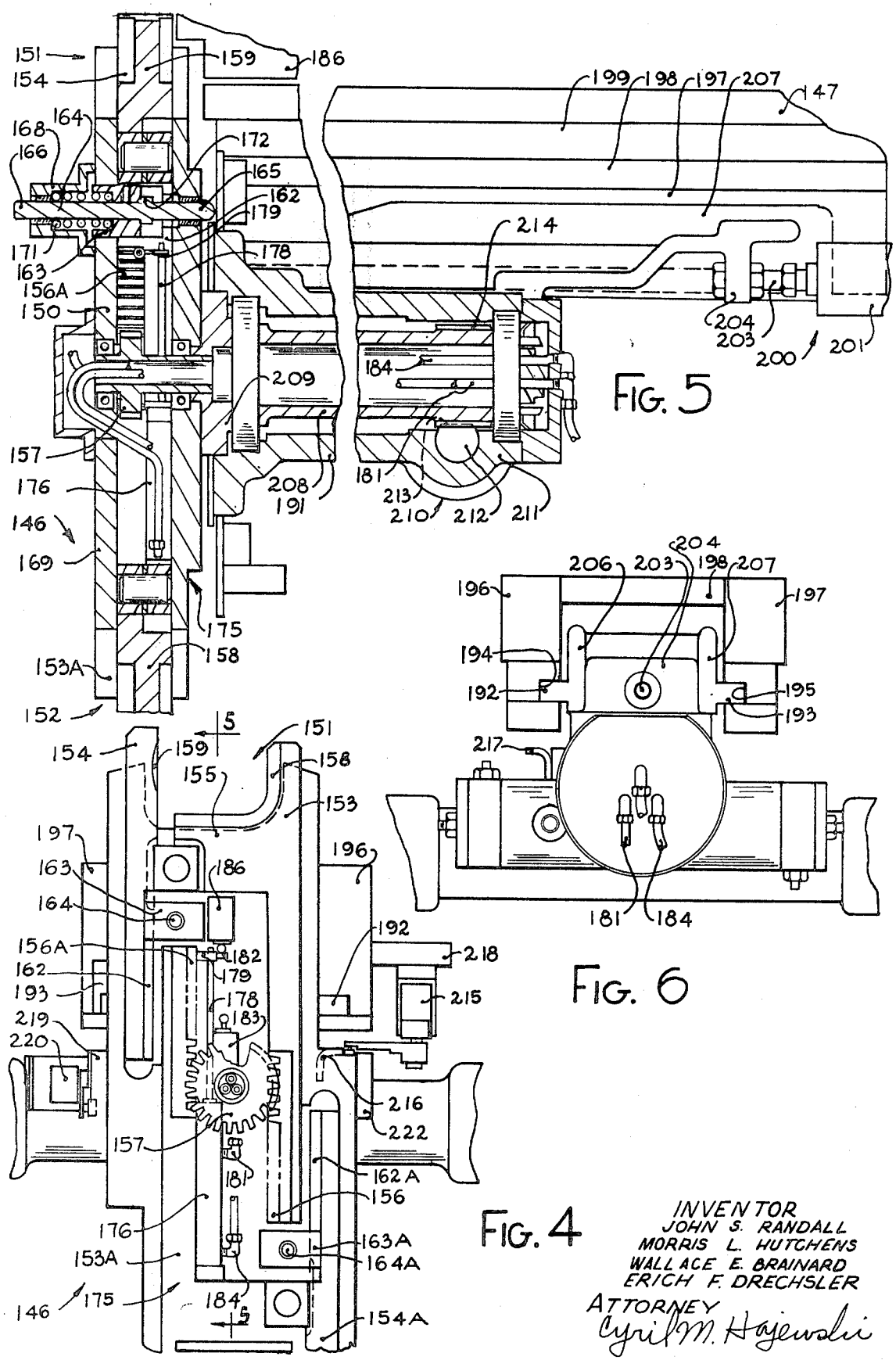

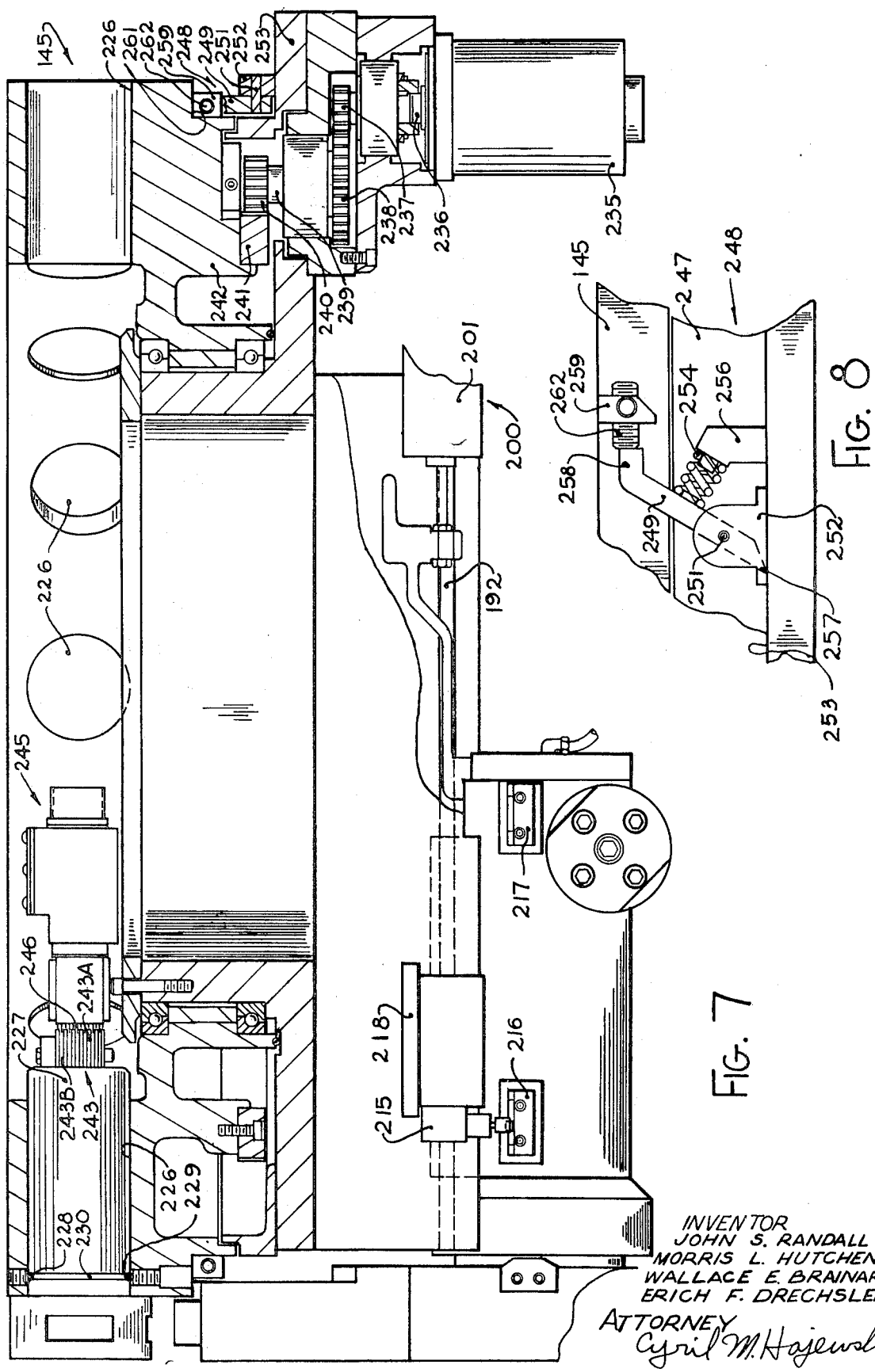

Dec. 29, 1970  J. S. RANDALL ET AL  3,550,487
MACHINE TOOL
Original Filed May 22, 1967  8 Sheets-Sheet 6
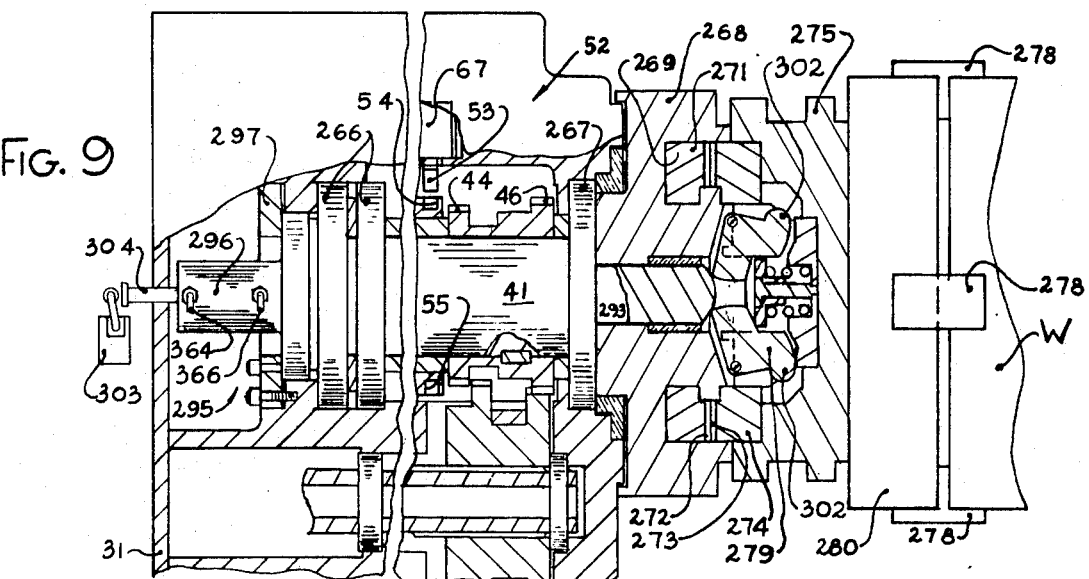
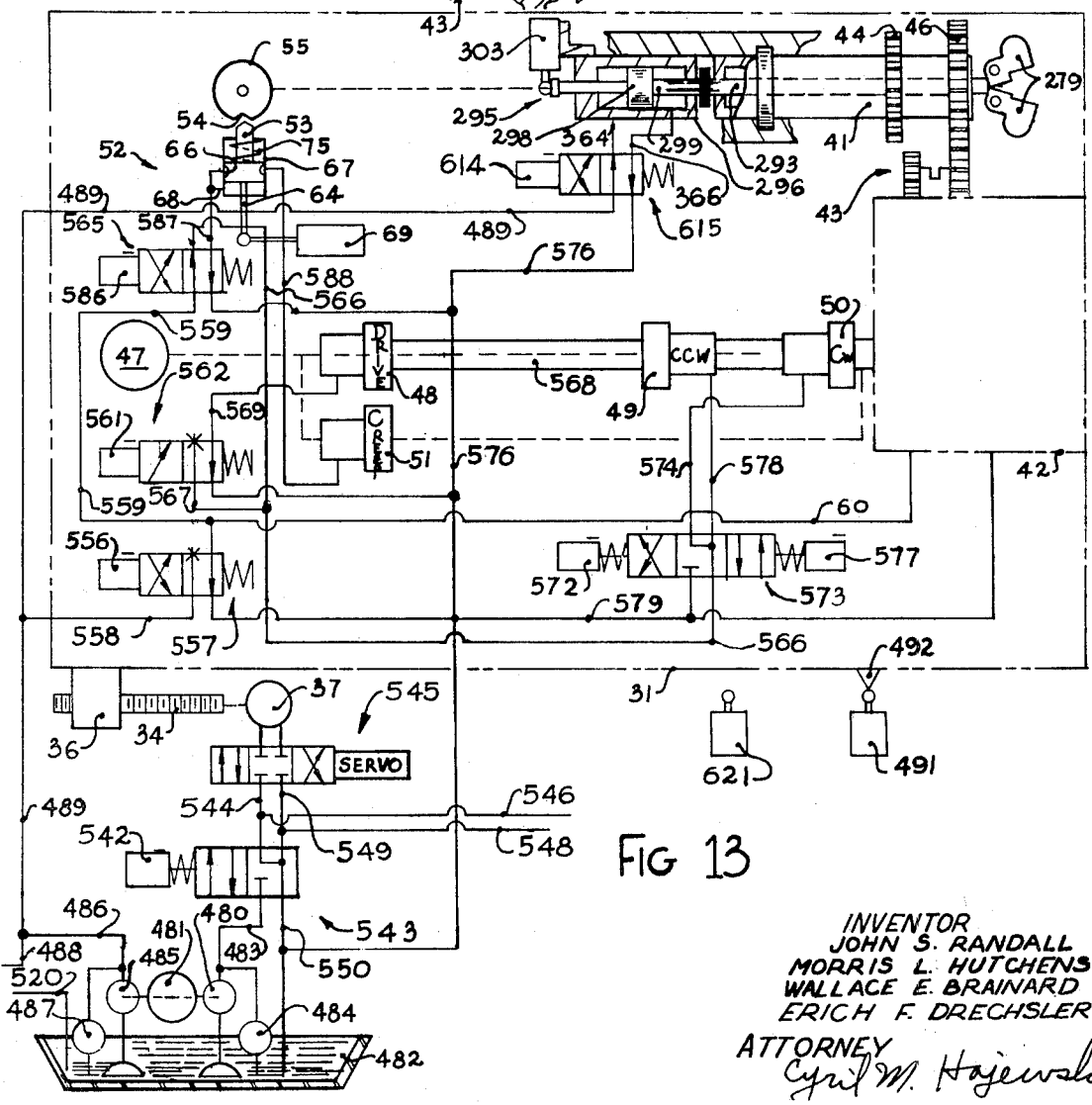
INVENTOR
JOHN S. RANDALL
MORRIS L. HUTCHENS
WALLACE E. BRAINARD
ERICH F. DRECHSLER
ATTORNEY
Cyril M. Hajewski

Dec. 29, 1970

J. S. RANDALL ET AL 3,550,487

MACHINE TOOL

Original Filed May 22, 1967

INVENTOR
JOHN S. RANDALL
MORRIS L HUTCHENS
WALLACE E. BRAINARD
ERICH F. DRECHSLER

ATTORNEY
Cyril M. Hajewski

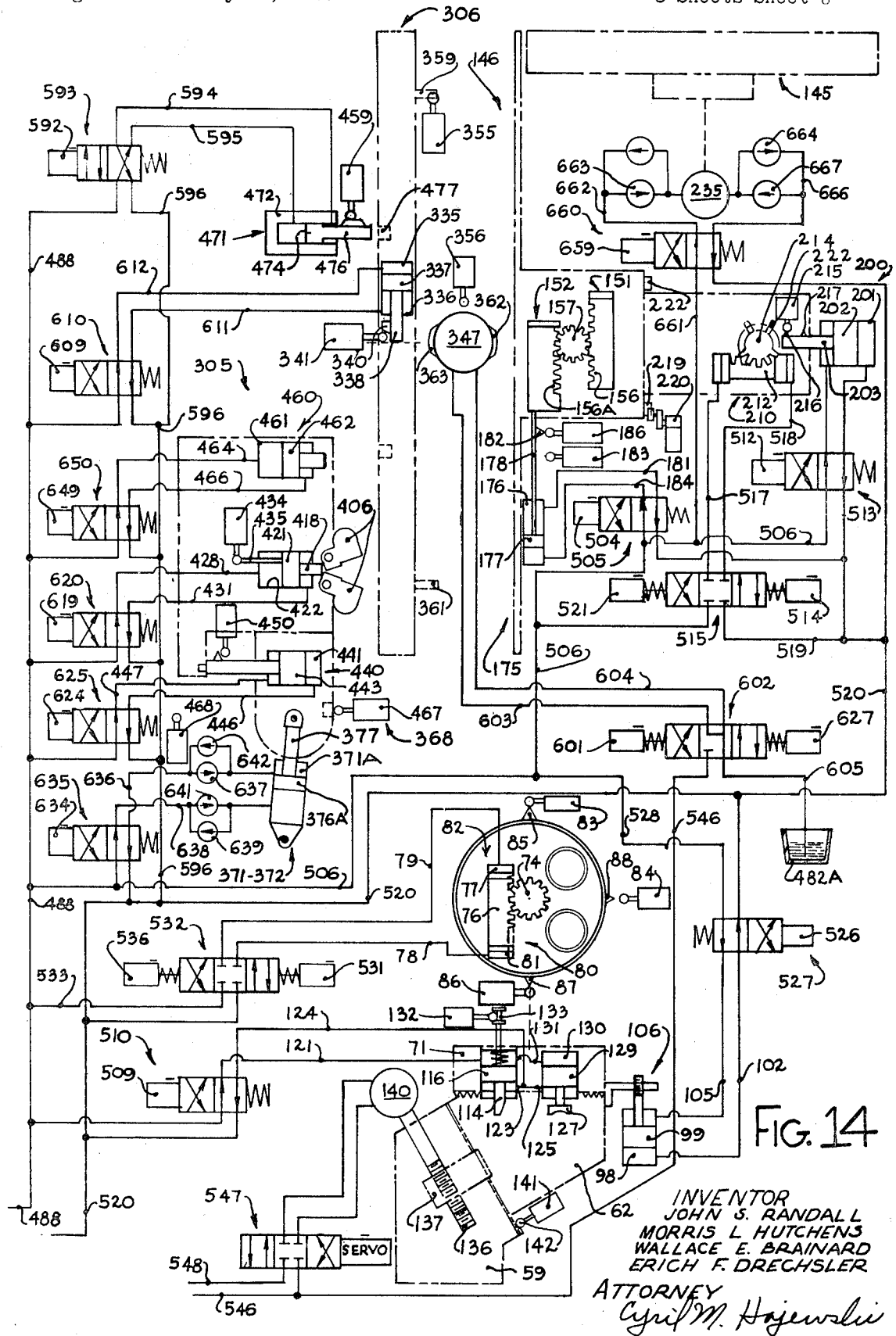

3,550,487
MACHINE TOOL

John S. Randall, Shorewood, Morris L. Hutchens, Brookfield, Wallace E. Brainard, New Berlin, and Erich F. Drechsler, Milwaukee, Wis., assignors to Kearney & Trecker Corporation, West Allis, Wis., a corporation of Wisconsin
Continuation of application Ser. No. 641,435, May 22, 1967. This application July 17, 1969, Ser. No. 866,046
Int. Cl. B23b 13/00
U.S. Cl. 82—2.5                                           6 Claims

ABSTRACT OF THE DISCLOSURE

Disclosed herein is a machine tool having a tool storage magazine and a tool changer arm operable to interchange a previously used tool in the tool operator with a new tool from the storage magazine. The machine tool is also provided with a workpiece set up device movable between a "load" position and a workpiece change position wherein a workpiece is located in a change station. In the change station the workpiece is located in the path of travel of a workpiece changer arm which is operable to effect a simultaneous interchange of workpieces between the set up device and the spindle of the movable headstock. With a new workpiece secured to the headstock spindle, the movements of the headstock and the tool operator are coordinated to effect a desired work operation on the workpiece. During the performance of a work operation the set up device with the previously completed workpiece is returned to the "load" position wherein the workpiece is removed and a new workpiece is secured to the set up device. Thereafter, the set up device is moved from the "load" position to position the new workpiece in the change station ready for subsequent transfer to the headstock spindle. A novel method of handling workpieces between the headstock spindle and the set up device has been conceived which makes it possible to effect an interchange of intermixed different diameter workpieces between the set up device and the headstock. To this end the set up device spindle head and the headstock spindle head are standardized to accommodate the standard fixture ring. Thus, the changer arm will engage the diameter of the standard fixture ring without regard for the diameters of the workpieces being transferred. As a result, an intermixture of different size workpieces can be programmed through the machine tool without altering or adjusting the machine components to accommodate for different sizes of workpieces.

---

This application is a continuation of Ser. No. 641,435, filed May 22, 1967 and now abandoned.

The present invention relates generally to machine tools and more particularly to a "Turning Center" machine tool. The improved machine tool is equipped with a plurality of cutting tools of different types that may be made individually operative automatically for performing a variety of turning operations on workpieces. The machine tool is also equipped with a workpiece changer operable to simultaneously effect an interchange of workpieces between the workpiece carrying spindle of the "Turning Center" and a workpiece set up and storage device.

It is a general object of this invention to provide a machine tool with improved facilities.

Another object of the present invention is to provide an improved machine tool equipped with a plurality of tools in storage and having automatic tool changing means for selectively placing any one of the stored tools in the tool operator of the machine tool.

Another object of the present invention is to provide an improved machine tool with a rotary work holding spindle and having automatically operated mechanical workpiece changer means operative to replace the workpiece in the spindle.

A further object of the present invention is to provide an improved machine tool with storage facilities for a workpiece that may be transferred to the workpiece spindle by power operated mechanical means.

Yet another object of this invention is to provide means for interchanging an intermixture of different size workpieces having different diameters between a workpiece set up device and a machine tool headstock.

Still another object of the present invention is to provide a workpiece carrying fixture ring which is interchangeably securable to the spindle head of a machine tool headstock and a spindle head of a set up device.

A further object of the present invention is to provide a standard workpiece carrying fixture ring which is transferable between a set up device and a headstock member by a changer mechanism.

Still another object of the present invention is to provide an improved machine tool with a workpiece storage facility that is selectively positionable from a workpiece change position to a non-interfering "load" position wherein a previously machined workpiece may be removed and a new workpiece stored therein for transfer to the work carrying spindle of the machine tool, while a machining operation is being performed on a workpiece carried by the headstock spindle.

Yet another object of the invention is to provide a machine tool with a workpiece change arm that is carried in an inoperative position when not in use so that it will not interfere with the machining operation or the operation of a workpiece storage means.

A further object of the invention is to provide a machine tool with a workpiece storage means having a rotatable workpiece carrying spindle incorporating automatically operable workpieces securing means to facilitate the loading of a workpiece in predetermined angular relationship thereon for subsequent automatic transfer in predetermined angularly orientated position to the work supporting spindle of the machine tool.

According to this invention the improved machine tool is equipped with a rotary spindle and a workpiece adapted to be received by the spindle for rotation therewith for the performance of a work operation thereon. The workpiece is secured to a fixture ring which, in turn, is positioned on the workpiece set up and storage device at a "load" position and secured thereto so that the workpiece and fixture ring may be moved by the set up device as a unit to a workpiece change station. A mechanical workpiece changer will operate to remove the fixture ring with the workpiece secured thereon at the change position as a unit from the set up device and transfer the fixture ring and workpiece as a unit to the headstock spindle of the machine tool. At the same time the workpiece changer will operate to remove and transfer a fixture ring with a workpiece secured thereto and which has had a machining operation performed thereon from the headstock spindle and transfer the unit to the set up device for subsequent removal. With a workpiece interchange operation completed the workpiece changer will move to a "parked" position wherein it will not interfere with the operation of the turning center work spindle or the set up device. The new workpiece in the headstock spindle will have a machining operation or series of machining operations performed on it, and during the machining operation the set up device will be moved from the workpiece change position to its "load" position wherein the previously finished workpiece may be removed from the associated fixture ring and a new workpiece secured to the ring. Thereafter the set up device will be moved to the workpiece change position to present a new workpiece in position for subsequent transfer to the headstock spindle.

The machine tool includes a magazine provided with a plurality of tool storage sockets which are adapted to receive a tool in storage. The magazine is movable to position a selected desired tool at a tool ready position where it is available to a tool change for transfer to the tool operator of the machine. A tool transfer may be accomplished at the time that workpieces are being interchanged between the headstock spindle and the set up device by the workpiece changer or a tool transfer may be effected at any other time as may be necessary. With the invention all necessary tooling for performing a work operation on a workpiece or a series of workpieces are readily available for use by the tool operator and new workpieces are made readily available for placement in the headstock spindle of the machine tool.

The foregoing and other objects of this invention which will become more fully apparent from the following detailed description, may be achieved by means of the exemplifying apparatus depicted in and set forth in this specification in connection with the accompanying drawings, in which:

FIG. 1 is a view in side elevation of a machine tool turning center incorporating the present invention;

FIG. 2 is a view partly in vertical section and partly in elevation of the machine depicted in FIG. 1 as viewed from the right end thereof;

FIG. 3 is an enlarged detailed view in vertical section through the tool operator to show the internal mechanism;

FIG. 4 is an enlarged front view of the tool change arm with the cover removed to show the mechanism for operating the tool grips;

FIG. 5 is a view partly in elevation and partly in vertical section through the tool change arm and its associated actuator taken along the plane represented by the line 5—5 in FIG. 4;

FIG. 6 is a fragmentary view in right end elevation of the tool changer mechanism showing guideways and cylinder for effecting arm rotation;

FIG. 7 is an enlarged view in vertical section through the tool storage magazine taken along the plane represented by the line 7—7 in FIG. 1;

FIG. 8 is an enlarged fragmentary view of the mechanism for effecting precise location of the selected tool in the magazine at the tool ready station;

FIG. 9 is a view partly in elevation and partly in vertical section through the headstock and work holding spindle showing the internal mechanism therein;

FIG. 9A is an enlarged fragmentary detailed view in vertical section through the headstock spindle head;

FIG. 11 is an enlarged fragmentary right side view of the workpiece change arm shown in FIG. 10, with the cover removed to show the mechanism for locking workpieces in the grips;

FIG. 12 is an enlarged fragmentary detail view in vertical section through the workpiece set up device shown in FIG. 1, with the set up device being depicted in horizontal plane and in a retracted position and with the fixture ring and workpiece therein represented in the postition when in the workpiece change arm grip immediately after retraction of the set up device;

FIGS. 13 and 14 are diagrammatic views of the hydraulic circuit; and

FIG. 15 is an enlarged fragmentary detail view of the control console depicted in FIG. 1, showing the various switches thereon for effecting the operation of the machine in a manual mode.

Figure 10:
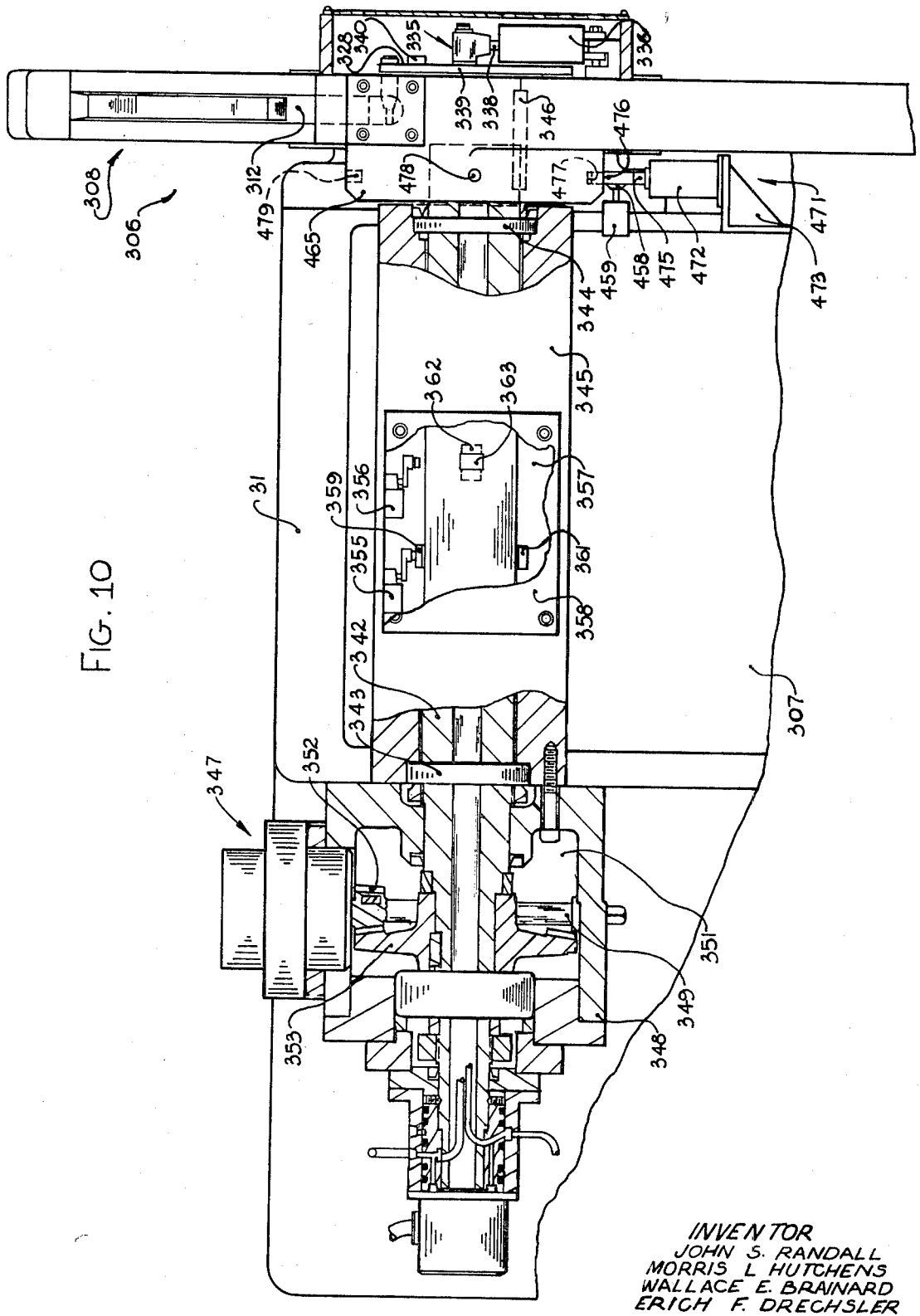
FIG. 10 is an enlarged fragmentary side view partly in elevation and partly in section of the workpiece change arm.

Referring now to the drawing, and more specifically to FIGS. 1 and 2 thereof, illustrating a machine tool turning center incorporating the features of the present invention, the machine comprises generally a bed 30 which slidably suports a spindle headstock 31. To this end the top surface of the bed 30 is provided with horizontal ways 32 which are engaged by complementary ways 33 formed on the bottom of the headstock 31.

Movement of the headstock 31 in either direction is effected by rotating a screw 34 which is in threaded engagement with a recirculating ball bearing nut 36 that is fixed to the undersurface of the headstock 31. The screw 34 is rotatably supported in suitable bearing structures (not shown) provided in the bed 30. Rotation of the screw 34 in either direction is effected by a motor 37 carried within the interior of the hollow bed 30 and connected to rotate the screw 34 for actuating the headstock 31 in its path of travel by power.

Positioning control for effecting the desired positioning of the headstock 31 so as to present a workpiece carried thereby at a selected position relative to a cutting tool is accomplished by operation of a cooperating scale 38 and sensing head 39. Positioning controls, such as the scale 38 and cooperating sensing head 39, are well-known commercially available units. The exemplary embodiment comprises essentially a linear scale 38 which is mounted on the side of the headstock 31 for movement therewith and relative to the cooperating sensing head 39. The sensing head 39 is fixedly carried on the side of the bed 30 in position to cooperate with the movable scale 38. Cooperative coaction between the sensing head 39 and the scale 38 provides an accurate feedback signal to indicate the position of the headstock 31 along the bed 30.

The headstock 31 rotatably supports a horizontally disposed workpiece spindle 41 constituting the machine work station that is adapted to receive a workpiece W for rotation therewith. The spindle 41 is rotatively driven at a selected one of a plurality of speeds obtained from a selectively shiftable transmission 42 carried within the headstock and diagrammatically depicted in FIG. 13. The output of the transmission 42 is transmitted to the spindle via a gear cluster 43 which is selectively shiftable into meshing engagement with one or another of a pair of spindle drive gears 44 and 46 that are secured to spindle 41. Power to drive the transmission 42 is obtained from an electric motor 47, diagrammatically illustrated in FIG. 13, that is also operably supported within the headstock 31. Power from the motor 47 is transmitted to the transmission 42 through a drive clutch 48 and a pair of directional clutches 49 and 50. Thus, with the spindle drive clutch 48 engaged and the directional clutch 49 also engaged, power from the motor 47 will be transmitted to the transmission 42 for driving the spindle 41 in a counterclockwise direction and at a selected speed as established by the transmission 42. On the other hand, with the clutch 49 disengaged and the directional clutch 50 engaged, the power input from the motor 47 to the transmission will serve to effect rotation of the spindle in a clockwise direction.

With power drive to the headstock spindle 41 discontinued the headstock spindle 41 is stopped in a predetermined angular position. To this end the normal power drive to the spindle is discontinued and the spindle is driven at a creep rate until the spindle 41 has been rotated into the predetermined angular position. This is accomplished by the operation of a creep clutch 51, depicted diagrammatically in FIG. 13. As shown, the creep clutch 51 is interposed in the spindle drive in parallel relationship to the drive clutch 48 and the two directional clutches 49 and 50. Thus, when the normal spindle drive is discontinued the drive clutch 48 and the two directional clutches 49 and 50 are disconnected from the input shaft of the transmission 42. Thereupon, the transmission is operated to establish a creep speed drive and the creep clutch 51 is operated for transmitting the output from the motor 47 directly to the input shaft of the transmission 42. Simultaneously with the operation of the creep clutch 51 a shot pin mechanism 52 is operated to move a shot pin 53 thereof into engagement with a locating notch 54 formed in the periphery of a plate 55. The plate 55, as depicted in FIG. 9, is mechanically connected to rotate with the spindle 41 and is angularly orientated relative to the spindle 41 in a manner that when the shot pin 53 engages in the locating notch 54, the spindle will be stopped in the desired predetermined angularly orientated position. Simultaneously therewith, the operation of the creep clutch 51 is discontinued so that the output of the motor 47 is not imparted to the transmission 42.

Upon the engagement of the shot pin 53 in the locating notch 54 to stop the headstock spindle 41 in the predetermined angularly orientated position, a signal is obtained to indicate that the headstock spindle is stopped in the predetermined position. To this end, a switch actuating rod 64 is secured to a shot pin actuating piston 66, as depicted in FIG. 13, which is reciprocally supported in a cylinder 67. With the transmission 42 operated to establish a creep speed drive, pressure fluid will be supplied to the head end of the piston 66 via a fluid line 68 which will be automatically connected to a pressure fluid supply line 587 by operation of valve means 565. As a result, the piston 66 is moved upwardly within the cylinder 67 to engage the free end of the shot pin 53 with the periphery of the notch plate 55. As the headstock spindle 41 is rotated at a creep speed, the notch plate 55 will also rotate with the spindle. When the plate 55 is angularly positioned to place the notch 54 opposite the shot pin 53, the shot pin will move into registry in the notch to stop the rotation of the spindle 41 with the spindle being located in the desired predetermined angular position. As the shot pin 53 moves into engagement in the locating notch 54, the rod 64 moving with the piston 66 will move inwardly into the cylinder 67 and will release the operating arm of a switch 69. With the switch 69 released it will operate to provide a signal to indicate that the headstock spindle 41 is stopped in the predetermined angularly orientated position. On the other hand when the headstock spindle 41 is to be rotated in a work operation, the transmission 42 will be operated to establish a desired spindle speed. Simultaneously therewith, the supply of pressure fluid to the head end of the piston 66 and to the actuating mechanism of the creep clutch 51 is interrupted. As a result, a spring 75, operably disposed within the cylinder 67 of the shot pin mechanism 52, in abutting relationship with the rod side of the piston 66 and the upper end of the cylinder 67, will expand to thereby return the piston 66 to its normal position, depicted in FIG. 13. The shot pin 53 is thereby disengaged from the locating notch 54 to release the headstock spindle 41. As the piston 66 moves downwardly within the cylinder 67 to retract the shot pin 53, the switch actuating rod 64 is moved outwardly of the cylinder 67. With the shot pin 53 in full retracted position, the rod 64 will be in a position to engage the operating arm of the switch 69 to actuate the switch. The switch 69 upon being actuated will operate to provide a signal to indicate that the headstock spindle 41 is released.

At the right hand end of the bed 30, as viewed in FIG. 1, the bed is provided with an upstanding cross slide supporting frame 56. The supporting frame 56 is a fabricated member bolted or otherwise secured to the top surface of the bed 30 and is provided with a machined upper flat surface 57 and an inclined side surface 58. A guideway structure 59 presenting a pair of parallel spaced ways 61 is rigidly secured to the inclined surface 58. The ways 61 are engaged by complimentary ways (not shown) formed on the under surface of a slide 62 that is supported on the ways 61 for reciprocal movement therealong. A tool operator generally identified by the reference number 63, is carried on the cross slide 62 for movement with it. In addition the tool operator 63 is also supported on the cross slide 62 for pivotal movement relative to the slide about an axis which is disposed perpendicular to the path of travel of the cross slide 62. Pivotal movement of the tool operator 63 serves to move the tool operator from a "bore" position wherein a tool generally identified by the reference number 65, carried by the tool operator 63, is disposed so that it extends leftwardly with its axis parallel to the axis of the spindle 41, as depicted in FIG. 1, to a "turn" position wherein the tool 65 is disposed so that its axis is parallel to the direction in which the slide 62 is movable, as depicted in FIG. 3.

The tool operator 63, shown in FIG. 3, generally comprises the base 70 which is suitably secured to the slide 62. The base 70 rotatively supports a frame 71 for precise positioning movement between the "bore" position and the "turn" position. To this end, the frame 71 is provided with a downwardly extending shaft 73, the depending end of which is formed with an axial bore indexing drive gear 74 that is selectively driven by means of a fluid actuator 80. The gear 74 is disposed in meshing engagement with a gear portion 75 formed on a plunger 76 reciprocally supported within the cylinder 77 formed integrally within the base 70. As diagrammatically illustrated in FIG. 14, the plunger 76 is provided with piston heads on either end thereof to constitute a double end piston that is reciprocally supported within the cylinder 77. With the plunger 76 located within the cylinder 77, as depicted in FIG. 14, the tool operator 63 will be in a "turn" position wherein the tool 65 is disposed with its axis transverse to the axis of the spindle 41. On the other hand, fluid pressure supplied to the lower end 81 of the cylinder 77 via a connecting line 78, and with the upper end 82 of the cylinder 77 connected to the reservoir via a line 79, the piston 76 will be moved to the opposite end of the cylinder 77, thereby effecting the clockwise rotation of the gear 74 to move the tool operator 63 from the "turn" position to the "bore" position wherein the tool carried in the operator will be positioned so that its axis will be disposed or parallel to the axis of the spindle 41.

For retaining the tool operator 63 in clamped engagement with the base 70 there is provided a disengageable coupling 90. The coupling 90 comprises an annular ring 91 which is secured in concentric relationship to the inner surface of the housing 71. The ring 91 is provided on its lower face with circumferentially spaced, radially formed angular clutch teeth 92 disposed to have meshing engagement with complementary clutch teeth 93 integrally formed on another ring 94 that is secured to the base 70 in coaxial relationship with respect to gear 74 and the ring 91. Movement of the housing 71 downwardly operates to urge the clutch teeth 91 into tight meshing engagement with the clutch teeth 93 of the fixed ring 94, thus retaining the frame 70 in a selected position of angular adjustment.

In order to effect the indexing movement of the frame 71 to position the tool operator either in a "bore" position or its "turn" position, the frame 71 is bodily elevated by the operation of a fluid actuator 106 to effect the separation between the clutch teeth 92 of the ring 91 and the clutch teeth 93 of the fixed ring 94. To this end, the base 70 is provided with a bore 95 which is concentric with the bore in which the gear 74 is disposed. The bore 95 receives a flanged member 96 which, in turn, is provided with an axial bore 97 having a concentric counterbore which forms a cylinder 98. A piston 99 is supported for reciprocal movement in the cylinder 98 and is provided with a piston rod which extends upwardly and through the bore 97 into coupled engagement with the gear 74. A cylinder cap 101 is provided to seal the open end of the cylinder 98. Pressure fluid supplied to the cylinder 98 at the head end of the piston 99 via a passage 102 and an interconnecting passage 103 formed in the flanged member 96 and the base 70 respectively, will effect axial upward movement of the piston 99, thereby effecting upward movement of the frame 71, a distance sufficient sufficient to effect a separation between the clutch teeth 92 and the stationary clutch teeth 93. With the frame 71 in elevated position the plunger 76 may be operated to effect the selective indexing movement of the tool operator 63. On the other hand, with the chamber at the head end of the piston 99 connected to the reservoir and pressure fluid supplied to the rod end of the piston 99 via passages 104 and 105 will effect the downward movement of the piston 99 thereby drawing the frame 71 downwardly to engage the clutch teeth 92 with the stationary clutch teeth 93 to effect the clamped engagement of the tool operator 63 in a selected position.

It is apparent, that before the housing 71 can be rotated for positioning the tool operator 63 in either the "turn" or "bore" position, the housing must be elevated to effect a separation between the clutch teeth of the rings 91 and 94. After the tool operator 63 has been rotated a selected position the housing 71 will be lowered to effect a clamping of the tool operator in the selected position. To indicate the position of the tool operator 63, there is provided a pair of switches 83 and 84 which are carried on the base 70 and spaced 90° apart. With the tool operator 63 in the "turn" position as depicted in FIG. 3 and diagrammatically illustrated in FIG. 14, a dog 85 which is secured to the external surface of the frame 71 is positioned to actuate the switch 83. With the switch 83 actuated it will operate to provide a signal to indicate that the tool operator 63 is in the "turn" position. However, when the piston 76 has been actuated to effect the movement of the tool operator 63 from the "turn" position to the "bore" position, that it occupies as depicted in FIG. 1, the dog 85 rotating with the housing 71 will be moved into position to engage and actuate the switch 84, diagrammatically depicted in FIG. 14. With the switch 84 actuated it will operate to provide signal to indicate that the tool operator 63 is in the "bore" position, depicted in FIG. 1.

As previously mentioned the housing 71 is unclamped by being elevated prior to being rotated to the "turn" or "bore" position. After the tool operator is positioned in the desired position, the housing is lowered to clamp it to the base 70. To provide a signal to indicate that the housing 71 is clamped in the "turn" position there is provided a switch 86 which is carried on the base 70 diametrically opposite the "turn" position indicating switch 83, as diagrammatically depicted in FIG. 14. With the tool operator 63 in the "turn" position and clamped, a dog 87 carried by the housing 71 will engage and actuate the switch 86. The actuated switch 86 will operate to provide a signal to indicate that the housing 71 is clamped. On the other hand, with the housing in the elevated unclamped position, the dog 87 moving upwardly with the housing will release the operating plunger of the switch 86 to release the switch. With the switch 86 released a signal is provided to indicate that the housing is in elevated unclamped position. Upon rotation of the tool operator 63 to the "bore" position and the subsequent lowering of the housing 71 into clamped engagement with the base 70 another dog 88 which is carried by the housing 71 and spaced 90° from the dog 87 will engage the operating plunger of the switch 86 to actuate the switch to provide a signal to indicate that the housing is in lowered clamped position. The dog 88 is arranged to pass inside of the inwardly extending end of the operating arm of the switch 84 so that it will not actuate this switch as the housing rotates from the "turn" position to the "bore" position.

The tool operator 63 is adapted to receive and hold a tool 65 such as the tool having a cutting portion 65A for performing a work operation on a workpiece W carried by the spindle 41. To this end, the operator 63 is provided with a tool receiving bore 111 which is formed in the frame 71. The bore 111 is of sufficient depth to accommodate the shank of the tool proper as well as to provide a protective enclosure for the code elements 112 carried on the axial end of the tool 65. The bore 111 extends through the frame 71 with the outer end of the bore being closed by a plate 113 which effectively acts as a barrier to prevent contamination such as chips, dirt and grease from entering the closure and damaging the code elements 112. The tool 65 is properly seated within the bore 111 and drawn axially inwardly thereof by means of a wedge plunger 114 which is adapted to engage in a notch 115 formed in the peripheral surface of the shank portion of the tool 65, as depicted in FIG. 3. The plunger 114 is secured to a piston 116 that is supported within a cylinder 117 formed in a head block 118 of the tool operator 63. A cap member 119 is secured to the head block 118 so as to close the cylinder 117. With the tool 65 inserted within the bore 111, fluid pressure is supplied to the head end of the piston 116 via a line 121 and an interconnecting passage 122 formed in the head block 118. Pressure fluid to the head end of the piston 116 will force the rod to move downwardly and engage in notch 115 which, due to the complementary wedge surfaces of the notch 115 and the rod 114, will draw the tool inwardly within the bore 111 to properly orient the tool within the bore. On the other hand, to release the tool, pressure fluid is applied to the rod end of the piston 116 via a passage 123 and a common passage 124 which is also connected to a passage 125. The pressure fluid supplied to the rod end of the piston 116 will move the piston upwardly thereby withdrawing the rod from the notch 115 to effect the release of the tool. A spring 126 is disposed within the cylinder 117 in abutting engagement with the cap 119 and the head end of the piston 116 and normally urges the piston 116 downwardly so as to engage the piston rod 114 in the notch 115 of the tool 65 to prevent the accidental displacement of a tool should a failure occur in the hydraulic system. In addition to the plunger 114, there is also provided a forward clamp member 127 which is formed on the lower end of a piston rod 128 that is threadedly coupled to a piston 129 movable within a second cylinder 130. The clamp member 127 is actuated into clamping engagement with the periphery of the tool 65 in sequence and after the locating plunger 114 has been moved into engagement within the notch 115 of the tool. To this end, an interconnecting passage 131 is formed in the head block 118 to interconnect the cylinder 117 with the cylinder 130. Thus, as pressure fluid within the cylinder 117 at the head end of the piston 116 is supplied thereto in sufficient quantity to move the piston 116 downwardly, the excess fluid will flow into the cylinder 130 at the head side of the piston 129, via the passage 131, to move the piston 129 downwardly thereby engaging the clamp member 127 with the peripheral surface of the tool 65. On the other hand, when the piston 116 is moved upwardly to retract the rod 114 out of the notch 115, fluid pressure will be simultaneously supplied to the cylinder 130 at the rod side of the piston 129 via the connected line 125 which is connected to the common supply line 124. Thus, retraction of both the locating rod 114 and the clamp member 127 is accomplished simultaneously.

To indicate whether the locating plunger 114 and the clamp member 127 are in released or clamping position there is provided a switch 132 which is secured on the top of the cap member 119. The switch is disposed so that its actuating plunger is in a position to be engaged by one or the other of spaced collars on an actuating rod 133 that is secured to the head end of the piston 116 and which is arranged to extend outwardly of the cap member 119. As shown in FIG. 3, with the piston 116 in lowermost position so that the rod 114 is engaged in the notch 115 of the tool 65, the rod 133 moving with the piston will be drawn downwardly so that the uppermost collar is moved into position to engage the operating arm of the switch 132 to actuate the switch. The actuated switch 132 will provide a signal to indicate that the locating rod 114 is in engagement with the notch 115 of the tool. On the other hand, when the piston 116 is moved upwardly to draw the locating rod 114 from the notch 115, the lowermost collar on the rod 133 will be moved upwardly to engage the operating arm of the switch 132 to move the arm in the opposite direction and actuate the switch to provide a signal to indicate that the tool 65 is unclamped.

Transverse movement of the slide 62 in either direction is effected by rotating a screw 136, depicted in FIG. 14, which is in engagement with a recirculating ball screw nut 137 that is fixed to the undersurface of the slide 62. The screw 136 is rotatively supported by the supporting frame 56, being journaled at its upper end in a gear box 138 that is secured to an angular bracket 139 which, in turn, is secured to the top surface 57 of the supporting frame 56. The lower end of the screw 136 is journaled in a suitable bearing (not shown) carried by the frame 56 in a well-known manner. The screw 136 may be rotated in either direction by a motor 140 which is mounted on the gear box 138 and connected to drive the screw 136 through a gear transmission (not shown) operatively disposed within the gear box 138 and connected to transmit power from the motor 140 to the screw 136.

Positioning control for effecting the desired positioning of the slide 62 so as to position the tool operator in a desired position relative to a workpiece is accomplished by operation of a well-known commercially available cooperating scale and sensing head mechanism, shown in FIG. 2. The mechanism comprises essentially a scale 143 which is secured to the side of the slide 62 so as to move with it. The sensing head 144 is suitably supported from the surface 58 in cooperative fixed position relative to the movable scale 143. Cooperative coaction between the sensing head 144 and the scale 143 provides an accurate feedback signal to indicate the position of the slide 62.

Thus, the headstock spindle 41 is operative to rotate the workpiece W as the headstock 31 is operated to move the workpiece longitudinally of the bed towards the tool operator 63. Simultaneously therewith, the tool operator 63 will be moved transversely to the path of travel of the headstock so that the tool 65 in the "turn" position, with its axis parallel to the direction in which the cross slide moves and perpendicular to the axis of the spindle 41, is fed towards the workpiece W to perform a turning operation on the peripheral surface thereof. However, if the work operation to be performed on the workpiece W is a boring operation, the tool operator 63 will be provided with a tool having a cutter similar to the boring bar 65B associated with the tool 65 in the magazine 145. In this case the tool operator will be indexed to the "bore" position, as depicted in FIG. 1. Under this condition the slide 62 will be moved downwardly to locate the boring tool 65B in a position where it will enter into the bore of the workpiece W as the spindle headstock 31 is moved to feed the workpiece to the tool. Upon entry of the boring tool 65B into the workpiece W, the slide 62 will be repositioned to engage the cutter portion of the boring bar 65B with the internal surface of the workpiece bore. Thereafter, coordinated movement of the slide 62 and the headstock 31 will be effected to produce the desired boring operation on the workpiece W.

When the tool operator slide 62 is in a retracted "home" position, wherein a tool carried by the tool operator located in the "bore" position is in range of the grips of the tool change arm 146 so as to be engageable thereby, a signal is obtained from a switch 141. To this end, with the slide 62 fully retracted to "home" position, depicted in FIG. 2, a dog 142 carried on the side of the slide 62, will be positioned in engagement with the switch 141 to actuate the switch.

The machine tool is equipped with an automatically operable mechanical tool changer which is operable to effect an interchange of tools between the tool operator 63 and a tool storage magazine 145. As shown in FIG. 1, a plurality of tools 65, each having a different cutter 65B, 65C and 65D are stored in the magazine 145. A tool change arm 146 is carried by a supporting cap 147 which is mounted on and secured to the upper flat surface 57 of the supporting frame 56. Thes tool change arm 146 is rotatively supported in the cap 147 for rotation about a horizontal axis which is disposed parallel to the axis of a tool 65 in a tool change ready position 148, as shown in FIG. 1. In addition to being rotatively mounted in the cap 147, the arm 146 is supported therein for selective axial bodily movement, wherein it will operate to remove a tool from the magazine 145 and the tool operator 63, and to insert tools therein. As depicted in FIGS. 4 and 5, tool change arm 146 is a hollow housing structure 150, which is provided with a pair of oppositely extensible tool grips 151 and 152. The grips 151 and 152 are selectively movable from a retracted position within the tool housing 150 into fully extended clamped engagement with tools 65 respectively carried by the storage magazine 145 and the tool operator 63. The grips 151 and 152 are identical and a description of the grip 151 will apply likewise to the grip 152.

As shown in FIGS. 4 and 5, the grip 151 comprises a pair of finger members 153 and 154 which are slidably supported in the housing 150. The finger 153 is provided with a laterally extending portion 155 to which the finger 154 is pivotally connected. The finger 153 also has a rearward extension which is provided with a rack 156 that is disposed in meshing engagement with a pinion 157 which is rotatably supported within the housing 150. The grip 152, as previously mentioned, is constructed in the same manner and operates simultaneously with the grip 151. Thus, rotation of the pinion 157 in a counterclockwise direction, as viewed in FIG. 4, will effect the simultaneous movement of the fingers 153 and 153A outwardly of the housing 150 into an extended position. As the fingers 153 and 153A move outwardly of the housing 150, the associated pivotal fingers 154 and 154A will also move outwardly and, upon their engagement with the periphery of the collar 65 of a tool 65 in the magazine 145 at the tool ready station 148, and with a tool in the tool operator 63, the fingers 154 and 154A will pivot in a counterclockwise direction to permit the grips 151 and 152 to firmly engage on the collar portion 159, FIG. 3, of the tools 65. The fingers 153 and 154 are provided with centrally disposed tongue portions 158 and 159 respectively; the tongue portion 158 associated with the finger 153 is constructed to extend along the lateral extension 155. Thus, when the fingers 153 and 154, and likewise the fingers 153A and 154B engage on the collar 160 of tools 65, the tongue portions 158 and 159 will engage in recesses 161 formed in the collar 160 of the tool. In this manner, the angular orientation of the tool 65 will be maintained so that with each tool interchange operation of the arm 146 for transferring tools between the magazine 145 and the tool operator 63, the tools will be maintained in the same angularly orientated position.

With the grips 151 and 152 engaged with tools 65, the grips are locked to secure the tools to the grips. To this end, as depicted in FIG. 4, the inwardly extending end of the pivotal fingers 154 and 154A are provided with longitudinally extending bevel surfaces 162 and 162A, which are adapted to be engaged by a bevel undersurface of camming blocks 163 and 163A, respectively. The blocks 163 and 163A are secured to rods 164 and 164A. As shown in FIG. 5, the inner end 165 of the rod 164 extends through and beyond the rear face of the housing 150 and engages the face of the supporting cap member 147. The opposite end 166 of the rod 164 also extends outwardly of the housing 150 in the opposite direction and passes through a cap 168 that is secured to the outer surface of the housing cover plate 169. A spring 171 mounted about the rod 164 and disposed in abutting engagement with the face of the cap member 147. Under this condition apply a force to the block 163 to bias the block 163 rightwardly, as viewed in FIG. 5, or inwardly, as viewed in FIG. 4. However, with the arm 146 in vertical retracted "parked" position, the end 165 of the rod is in engagement with the face of the cup member 147. Under this condition the rod 164 is forced leftwardly, as viewed in FIG. 5, or outwardly, as viewed in FIG. 4. As a result, a flange 172 on the rod 164 engages the inner face of the block 163, forcing it leftwardly or outwardly. As a result, the bevel undersurface of the cam block 163 is moved out of forceful engagement with the cam or bevel surface 162 formed on the pivotal finger 154. Thus, with the arm 146 in retracted vertical position, as depicted in FIGS. 1 and 5, as the grip 151 moves outwardly of the housing 150 into engagement with a tool 65 in the magazine 145 at the tool ready position 148, the finger 154 will be free to pivot in a counterclockwise direction to allow the grip to pass the diameter of the tool collar. Since the grip 152 is constructed in the same manner as the grip 151, the finger 154A associated with the grip 152 will operate in the same manner. With the grips 151 and 152 in engagement with the tools 65 in the magazine 145 and the tool operator 63, the arm 146 will be caused to move outwardly to remove the tool from the magazine and simultaneously to remove a previously used tool from the tool operator. As the arm 146 moves outwardly away from the cap member 147 and the tool operator 63, the spring 171 will react to move the rod 164 and 164A and thereby the associated cam blocks 163 and 163A rightwardly, as viewed in FIG. 5, or inwardly, as viewed in FIG. 4. This action will forcefully engage the cam or bevel undersurface of the cam blocks 163 and 163A with the bevel or cam surfaces 162 and 162A on the pivotal fingers 154 and 154A. As a result, the fingers 154 and 154A will be forcefully urged in a clockwise direction thereby securely locking the tool in the grips. After the arm 146 has been rotated 180° to interchange the positions of the grips 151 and 152 and is in a retracted vertical position to thereby insert the interchange tools in the magazine 145 and the tool operator 63, the inner ends of the rods 164 will engage the front face of the cap member 147 to effect a release of the pivotal fingers 154 and 154A. With the pivotal fingers 154 and 154A released, the grips 151 and 152 will be retracted inwardly into the housing 150. As the grips 151 and 152 retract, the fingers 154 and 154A will pivot in a counterclockwise direction slipping past the diameter of the tool collar, leaving the tools in the magazine 145 and tool operator 63.

To effect the simultaneous extension and retraction of the grips 151 and 152 there is provided a fluid actuator 175 comprising a cylinder 176 carried within the interior of the arm housing 150. A piston 177, diagrammatically shown in FIG. 14, is reciprocally supported within the cylinder 176 and is provided with a piston rod 178 that extends outwardly of the cylinder 176. The extending end of the piston 178 is coupled to a laterally extending bracket 179 that is secured to the inwardly extending end of the finger 153A. With this arrangement, pressure fluid supplied to the rod end of the cylinder 176 via a fluid line 181 will effect the downward movement of the piston 177 within the cylinder, as viewed in FIGS. 4 and 14. As a result, the finger 153A will be moved downwardly and outwardly of the housing 150. As the finger 153A is moved downwardly, as viewed in FIG. 4, the idler gear 157 will be rotated in a counterclockwise direction. The counterclockwise rotation imparted to the gear 157 will effect the upward movement of the finger 153 moving it outwardly of the housing 150 to an extended position. As the finger 153A is moved to its full limit of outward travel, the extreme outer end 182 of the bracket 179 will be positioned in engagement with the actuating plunger of a switch 183 to actuate the switch to provide a signal to indicate that the grips are in extended position.

On the other hand, pressure fluid supplied to the cylinder on the head side of the piston 177 via a connected fluid line 184 will effect upward movement of the piston 177 within the cylinder 176. This upward movement of the piston 177 will effect upward movement of the finger 153A to retract the grip 152. Under this condition the gear 157 will be rotated in a clockwise direction to thereby effect the downward or inward movement of the finger 153. With the grips 151 and 152 fully retracted the end 182 of the bracket 179 will be positioned in engagement with an actuating plunger of another switch 186. The actuation of the switch 186 will provide a signal to indicate that the grips are in retracted positions, within the housing 150.

Axial movement of the tool change arm 146 for extending and retracting the arm is effected by operation of a quill 191. The quill 191 is supported for guided axial movement by means of horizontal ways 192 and 193 that are integrally formed on either side of the quill 191, as depicted in FIGS. 6 and 7. The ways 192 and 193 are engaged in longitudinally extending guideways 194 and 195 which are formed in a pair of spaced depending brackets 196 and 197 that, in turn, are secured to a supporting spacer plate 198. The spacer plate 198, in turn, is fastened to the inner surface of a transverse or horizontal plate 199 that is welded or otherwise secured to the undersurface of the cap member 147. Axial movement of the quill 191 is effected by means of a fluid actuator 200 comprising cylinder 201 that is secured to internal webbing formed in the cap member 147. A piston 202, diagrammatically depicted in FIG. 14, is supported in the cylinder 201 for reciprocal movement therein and is provided with a piston rod 203 which extends outwardly of the cylinder. The extending end of the piston rod 203 is secured to a transverse yoke 204 that extends between a pair of upright reinforcing members 206 and 207 formed integrally with the quill 191.

Rotation of the arm 146 for effecting an interchange in the position of the grips 151 and 152 is accomplished by means of a tubular drive shaft 208 that is rotatively supported within the quill 191 in coaxial relationship therewith. The forward extending end of the hollow shaft 208 extends outwardly of the cap 147 and is provided with a circular mounting flange 209 to which the arm housing 150 is secured. Rotation of the drive shaft 208 is effected by means of a fluid actuator 210 comprising a cylinder 211 which is integrally formed with the quill 191. A piston 212 is reciprocately supported within the cylinder 211 and is provided with a gear portion 213 that is in meshing engagement with a pinion 214 integrally formed on the rear end of the drive shaft 208.

A signal to indicate the axial position of the arm 146 is obtained from a switch 215, depicted in FIGS. 4 and 7, which is mounted on a bracket 218 that is welded to the depending guideway bracket 196. A pair of dogs 216 and 217 are secured in spaced relationship on the quill 191.

Thus, when the arm is in retracted position the dog 216 is positioned in engagement with the operating arm of the switch 215 and actuates the switch in the one direction, and provides a signal to indicate that the arm is in retracted position. On the other hand, with the arm 146 moved to extended position the dog 217 moving with the quill 191 will engage the operating arm of the switch 215 actuating it in the opposite direction, and the switch will operate to provide a signal to indicate that the arm 146 is in an extended position. With the arm 146 in the vertical position, wherein the grip 151 is in the uppermost position and the grip 152 is in the lower position, as depicted in FIG. 4, a dog 219 secured to the side of the housing 150, is in engagement with the operating arm of a switch 220 which is secured to the left side of the quill 191. Thus, the operating arm of the switch 220 is moved downwardly. With this condition obtained, the switch 220 is actuated and operates to provide a signal to indicate this position of the arm. On the other hand, with the arm 146 rotated 180° wherein the grip 151 is moved to the lowermost position and the grip 152 is located in the uppermost position, a dog 222 shown on the right side of the arm housing 150, in FIG. 4, will be moved into a position to engage the operating arm of the switch 220 in the opposite direction. With the operating arm of the switch 220 moved upwardly by the dog 222, the switch will operate to provide a signal to indicate that the arm 146 is in a vertical position with the grip 152 in uppermost position.

The magazine 145 is adapted to carry a plurality of tools 65 having different cutters, such as the tools 65 with cutters 65B, 65C and 65D, in storage for subsequent transfer by the tool change arm 146 to the tool operator 63. To this end the magazine 145 is provided with a plurality of sockets 226 which are formed in the periphery of the magazine in equal angularly spaced relationship and extend radially outwardly of the magazine. Each of the sockets 226 is operable to receive and hold a tool 65 in storage. However, in FIG. 1 the magazine 145 is shown with only four tools in storage therein, but it is to be understood that tools may be stored in the magazine in every storage socket or any portion of the storage sockets therein.

The tool 65 has been referred to generally but as shown in FIGS. 1 and 7, it comprises a cutter 65B extending into a cylindrical shell 227 which is provided with an internal thread (not shown) for receiving a plug (not shown) against which the rearmost end of the cutter 65B is abutted. The periphery of the forward end of the shell 227 is provided with an external collar portion 161 which is adapted to be engaged by the grips 151 and 152 of the tool change arm for subsequent interchange between the magazine and the operator 63.

In order to store one of the tools 65 in a storage socket 226 the portion of this shell 227 that extends rearwardly of the collar 160 is inserted into the axial bore of a storage socket 226. The tool 65 is yieldably retained within the socket 226 by a pair of detent mechanisms 228 and 229 that engage in an annular groove 230 formed on the periphery of the shank of the tool shell 227.

The tool 65, which is selected for transfer to the tool operator 63 must be moved to the tool ready station 148 and this is accomplished by power through the operation of a reversible fluid motor 235. A fluid motor is shown as an exemplary embodiment although it is to be understood that an electrical motor could likewise be utilized for the purpose. The drive shaft 236 of the motor 235 is connected to drive a gear train comprising a gear 237 meshingly engaged with a gear 238 that is secured to the depending end of the vertical drive shaft 239. The upper end of the shaft 239 is provided with a pinion 240 that is in meshing engagement with a bull gear 241. The bull gear 241 is secured to an intermediate depending flange 242 formed on the bottom surface of magazine 145. As a result, actuation of the motor 235 will serve to rotate the magazine 145 to move the tool storage sockets 226 and tools 65, which they carry, in a circular path of travel about a vertical axis.

Each of the tools 65 is identified by a number and they are each coded in accordance with the binary system to indicate the number of the tool. To this end the axial inner end of each of the tools 65 is provided with ten code segments generally identified by the reference number 243 which constitute the coding, with each segment representing one of the digits of the binary numbering system. Each of these segments may be varied to extend behind the axial end face of the tools 65 a greater distance than others. The segments which are of greater depth, as exemplified by the code segment 243A, will represent the numeral one for the particular digit of the binary number, while the segments which do not extend rearwardly as far, as exemplified by a code segment 243B, indicate the numeral zero for that particular digit of the binary system.

Such coding of the tool 65 is read by a tool selector or reading head generally identified by the reference numeral 245. Prior to actuating motor 235 for rotating the magazine 145, the identification number of the desired tool is impressed upon the electrical control system, either manually or automatically, in a manner well-known in the art. Then, as the magazine 145 is rotated, the tool reading head 245 will read the segments 243 on the axial end of the tools which are stored in the magazine. When the number represented by the code segments 243, read by the reading head 245, coincides with the number impressed upon the electrical control system, the electrical control system will operate to reverse the direction of operation of the motor 235 to effect final precise positioning of the selected tools 65 in the ready station 148. As shown in FIG. 7, the reading head 245 comprises a plurality of actuating fingers or plungers 246 which are equal in number to the number of code segments provided on the tools 65. Each of the fingers 246 extends inwardly into the housing of the reading head and is associated with individual switches (not shown) contained within the head. Each of the fingers 246 is yieldably urged outwardly of the reading head housing into the path of travel of the code segments 243 on the tools as the tools move past the reading head 245. Thus, the longer code segments 243A will engage and actuate associated ones of the fingers 246 to move them inwardly into the reading head housing. The actuated fingers 246, in turn, will actuate their associated switches (not shown). On the other hand, the smaller code segments 243B will not actuate an adjacent finger 246 and the switches which are associated with the nonactuated fingers will remain deactuated. Thus, actuated reading head switches (not shown) will indicate the numeral one (1) for the particular digit of the binary number which it is associated with. On the other hand, a deactuated reading head switch (not shown) will indicate a zero for the particular digit of the binary number. For a more complete description of a reading head and an associated circuit which will operate in the manner indicated, reference may be had to U.S. Pat. Re. 25,737 to W. E. Brainard et al.

When the number impressed upon the tool reading head 245 by the coding on a particular tool, coincides with the number impressed upon the electrical control system for selecting the desired tool, the motor 235 will be deactuated to terminate the forward rotation of the magazine 145. When this occurs, the magazine 245 will have overrun the desired tool ready position 148 so that the selected tool 65 will be slightly beyond the tool ready station 148. Therefore, the motor 235 is immediately operated in a reverse direction and at a relatively slow rate until the desired tool 65 is accurately located at the tool ready station 148. The reverse rotation of the motor 235 is not terminated at this time but the motor is maintained energized for maintaining the magazine 145 in the final position for precisely locating the selected desired tool in the ready station 148.

A stop mechanism 248, shown in FIGS. 7 and 8, is operative to stop the reverse rotation of the magazine 145 to effect the precise location of the magazine 145 for locating the selected tool at the tool ready station 148. The stop mechanism 248 is carried by the cap member 147 and is located diametrically opposite the tool ready station 148 and comprises a latch 249 which is pivotally mounted on a pin 251 carried in a bracket 252. The bracket 252 is secured on a flange portion 253 of the supporting cap 147. As shown in FIG. 8, a spring 254 supported by a bracket 256 is disposed to operate on the latch 249 to urge it in a counterclockwise direction. However, the pivotal movement of the latch 249 in a counterclockwise direction is restricted by operation of the lower end 257 thereof engaging the surface of the flange 253. With the latch 249 biased in a counterclockwise direction to its full limit of travel, the upper head portion 258 thereof is positioned in the arcuate path of travel of dogs 259, one of which is shown. The dogs 259 are secured to the undersurface of an annular recess 261 formed in the magazine 145. The dogs 259 are each associated with a storage socket 226 and each dog is positioned with respect to its associated socket in a manner that an imaginary line which passes through the axis of a socket will also be tangent to the end of a screw 262 adjustably secured in the dog. Thus, as the magazine 145 is rotated in a tool selecting movement which, as viewed in FIG. 8, is from left to right, the dogs will engage the head end 258 of the latch 249 forcing it to pivot in a clockwise direction. As a dog passes the latch 249, the spring 254 operates to immediately return the latch to its normal upright position. As a result, when a particular tool has been selected, the magazine 145 will continue to rotate so that the selected tool is moved past the tool ready station 148. Thereafer the operation of the motor 235 is reversed to rotate the magazine in the reverse direction or from right to left, as viewed in FIG. 8. As a result, a dog 259 located directly opposite to the socket in which the selected desired tool is stored will engage the upward projecting end of the magazine 145. This will locate the selected desired tool at the tool ready station 148. This is true because as previously mentioned, the number of storage sockets 226 provided in the magazine 145 is an even number of sockets. Therefore, since the code reader 245 is located adjacent the tool ready station 148 and identifies and selects the desired tool as it passes through the ready station 148, the dog 259 diametrically opposite the socket in which the desired tool is stored, will pass over the latch 249 as the selected tool moves past the tool ready station 148. This dog will then engage the projecting end of the latch stopping the magazine with the desired tool precisely in the tool ready station 148. The motor 235 is maintained energized for operation in the reverse direction to thereby maintain the dog 259 in positive engagement with the latch 249.

As previously mentioned, the headstock 31 rotatively supports the workholding spindle 41 for presenting the rotating workpiece W to the tool operator 63 for the performance of the work operation. As shown in FIGS. 9 and 9A, the workholding or headstock spindle 41 is rotatively supported in the headstock by a pair of bearings 266 and a single forward bearing 267. The spindle 41 extends outwardly of the headstock 31 and is provided with an enlarged circular head portion 268 which is provided with an annular recess 269. An annular ring 271 is fixedly mounted within the recess 269 in concentric relationship. The ring 271 is provided with circumferentially spaced, radially formed angular clutch teeth 272 adapted to have meshing engagement with complementary clutch teeth 273 formed on another ring 274 that is secured to a fixture ring or adaptor 275. The fixture ring 275 is adapted to be engaged on the head portion 268 of the spindle 41. To this end the fixture ring 275 is provided with an internal recess 276 having a counterbore 277 in which the ring 274 is secured. With this arrangement, when the fixture ring 275 is engaged on the spindle head 268 the clutch teeth 273 of the ring 274 associated with the fixture ring, will engage with the clutch teeth 272 of the ring 271 associated with the spindle head 268. As a result, the fixture ring 275 will be centered with respect to the spindle head 268 so that the axis of the spindle 41 will coincide with the axis of the fixture ring 275 and a driving connection between the fixture ring 275 and the spindle 41 is also established.

The fixture ring 275 is provided with a chuck mechanism 280 having a plurality of radially movable clamp members 278 that are operable to be engaged with the periphery of the workpiece W for clamping the workpiece to the fixture ring 275 in a well-known manner.

To clamp the fixture ring 275 to the spindle head 268, a plurality of radially movable clamp elements 279 are provided in the spindle head 268. The clamp elements 279 are pivotally movable into clamping engagement with an inner surface 281 of the clutch ring 274 that is secured to the fixture ring 275. The clamp elements 279 are similar and each is provided with a pair of laterally extending studs 282 which are seated in concave recesses formed on either side of an inclined slot 283. The slots 283 are equal in number to the number of clamp elements and are formed in the axial face of an internal central hub portion 284 formed in the spindle head 268. A cap member 285 having an internal bore 286 is secured to the axial end of the internal central hub 284. The cap member 285 is provided with a plurality of radial slots 290 through which the clamp elements 279 extend when they are moved into clamping engagement with the surface 281 of the clutch ring 274 associated with the fixture ring 275. The cap member 285 is also provided with semi-circular recesses 287 which are formed on either side of each of the slots and which engage on the lateral studs 282 of the clamp elements 279 and serve as bearing caps for retaining the clamp elements 279 in operative position in the hub 284. Each clamp element 279 has a notched portion which forms a shoulder 288 which is engaged by an axially movable flanged sleeve 289. The sleeve 289 is slidable on a stud 291 which extends axially inwardly from the blind end of a reduced diameter portion of the bore 286. A spring 292 is mounted around the sleeve 289 and disposed in abutting engagement with the base of the bore 286 and the flange end of the sleeve 289 and operates to bias the sleeve downwardly, as viewed in FIG. 9A, or leftwardly, as viewed in FIG. 9. The leftward bias applied to the sleeve will forcefully engage the flanged end of the sleeve with the shoulder portions 288 of the clamp elements 279 to pivot the clamp elements inwardly into their respective slot 290 in the cap 285. Thus, the clamp elements 279 are normally retained in full retracted position within the cap 285 by operation of the spring 292 and sleeve 289.

To effect outward pivotal movement of the clamp elements 279 into forceful clamped engagement with the surface 281 on the inner surface of the clutch ring 274 associated with the fixture ring 275, there is provided an axially movable actuating rod 293. The rod 293 is supported for slidable movement in an axial bore formed in the spindle 41. Axial movement of the actuating rod 293 is effected by means of a fluid actuator 295, shown in FIGS. 9 and 13. The fluid actuator comprises a cylinder 296 which is secured to an internal web of the headstock 31 by means of a retaining ring 297. A piston 298 is reciprocally supported within the cylinder 296, as diagrammatically shown in FIG. 13, and is provided with a piston rod 299 that extends outwardly of the cylinder 296. The piston rod 299 is connected to the axial inner end of the actuating rod 293. As viewed in FIG. 13, rightward movement of the piston 298 within the cylinder 296 will effect the axial rightward movement of the actuating rod 293 to forcefully engage the end of the rod with inwardly extending arm ends 301 of the clamp elements 279. The axial rightward movement of the actuating rod 293, as viewed in FIGS. 9 and 13, will effect the simultaneous pivotal movement of the clamp elements 279 and move them radially outwardly of the cap 285. The radial outward movement of the clamp elements 279 will serve to engage a nose portion 302 of each of the clamp elements 279 with the clamp surface 281 provided on the inner surface of the clutch ring 274. Thus, the fixture ring 275 carrying the chuck mechanism 280 and the workpiece W will be centered with respect to the axis of the spindle 41 and will be securely clamped to the spindle with a positive drive connection being established therebetween.

To release the fixture ring 275 from clamped engagement with the spindle head 268, the clamp actuating rod 293 is moved leftwardly, as viewed in FIGS. 9 and 13, to a retracted position. As a result, the sleeve 289 through the operation of the spring 292 will forcefully engage the shoulder 288 of the clamp elements to effect the simultaneous pivotal movement of the clamp elements 279 to a retracted position within the cap 285.

To indicate that a fixture ring such as the fixture ring 275, is clamped to the headstock spindle 41 there is provided a switch 303 which is operative to provide a signal to indicate that the clamp elements 279 have been actuated into clamping engagement with the fixture ring 275. To this end, a rod 304 is secured to the piston 298 and extends outwardly of the end of the cylinder 296. With pressure fluid supplied to the head end of the cylinder 296 via a fluid line 364, the piston 298 will move rightwardly as viewed in FIGS. 9 and 13, to effect the pivotal movement of the clamp elements 279 into clamping engagement with the fixture ring 275. As the piston 298 is moved rightwardly, the switch actuating rod 304 is retracted inwardly into the cylinder 296. With the piston 298 positioned to its limit of rightward travel, the rod 304 will be retracted sufficiently far enough to effect a release of the switch 303. Thereupon, the switch operates to provide a signal which indicates that the fixture ring 275 is clamped to the headstock spindle 41.

On the other hand, when pressure fluid is supplied to the rod end of the cylinder 296 via a connected fluid line 366, the piston 298 will be moved leftwardly retracting the actuating rod 293 to unclamp the fixture ring 275. As the piston 298 is moved leftwardly, the rod 304 moving with the piston will engage the operating arm of the switch 303 to actuate the switch. The switch 303 upon being actuated operates to provide a signal to indicate that the fixture ring 275 is unclamped.

The machine tool, illustrated in FIGS. 1 and 2, is equipped with an automatically operable mechanical workpiece changer which is disposed at the side of the headstock 31 and constructed in accordance with the teaching of the present invention. To this end, a new workpiece NW is carried by a workpiece locating means hereinafter referred to as a set up and storage device generally identified by the reference number 305 which is operable to move the workpiece from the vertical position, depicted in FIG. 1, to a horizontal ready position, depicted in FIG. 12, into the path of travel of a workpiece change arm generally identified by the reference 306. The workpiece change arm 306 is carried by an upstanding bracket 307 which is diisposed at the side of the headstock 31 and is secured to the bed 30. The workpiece change arm 306 is supported for rotation about a horizontal axis and in a position wherein it will be operative to engage a workpiece W carried by the headstock spindle 41 and a workpiece NW presented by the set up device 305. Thereafter, the workpiece change arm 306 is operative to interchange the positions of the workpieces W and NW so that the new workpiece NW from the set up and storage device 305 is placed in operable position in the headstock spindle 41, while the workpiece W from the headstock spindle 41 is placed in the set up and storage device 305.

The workpiece change arm 306 is an S-shaped member, as depicted in FIG. 2, having a tool grip 308 on one end thereof, with the opposite end being provided with an identical workpiece grip 309, the two grips 308 and 309 being arranged in opposite facing relationship and transversely of the arm. The workpiece grips 308 and 309 are each provided with a pair of substantially semi-circular surfaces 310 for receiving an annular recess 311 provided on the fixture rings 275 and 275A. The workpiece grips 308 and 309 are provided with locking plungers 312 and 313 for positively retaining the workpieces within the semi-circular surfaces 310.

As shown in FIG. 11, the plungers 312 and 313 are disposed to engage in the recess 311 formed in the periphery of the fixture ring 275 in a manner to engage the bottom surface of the annular recess for locking the workpiece within the grips. The plungers 312 and 313 are identical and therefore a description of the plunger 312 associated with the grips 308 will be given, and the description will also apply to the plunger 313 associated with the grip 309. As shown in FIG. 11, the outer end of the plunger 312 is provided with an inclined surface 312A which will engage the bottom surface of the fixture ring recess 311 as the arm is moved in its arcuate path of travel to engage the grips 308 and 309 with workpieces. The plunger 312 is urged outwardly of the arm housing 314 by operation of a spring 315 which operates between an adjustable plug 316 and the bottom of the plunger 312. Outward movement of the plunger 312 is limited by means of an annular shoulder 317 formed on the inner end of the plunger 312 and which is adapted to engage an annular surface 318 formed within the body of the arm housing 314. Thus, as the arm 306 is rotated in its arcuate path of travel into engagement with the fixture ring 275 carrying the workpiece W, the plunger 312 is forced inwardly into the arm housing 314 so that the grip 308 firmly engages on the fixture ring 275. With the grip 308 fully engaged on the fixture ring 275, the spring 315 operates to move the plunger 312 outwardly of the arm housing 314 to engage an arcuate surface 319 thereof with the bottom surface of the recess 311.

Since the arm 306 operates to interchange the positions of workpieces within the grips 308 and 309 by means of a rotary motion, the plungers 312 and 313 are locked in their fixture ring engaging positions to positively insure that the workpieces are locked in each of the grips 308 and 309. To this end, the understurface of the plungers 312 and 313 are provided with wedge surfaces 312B and 313B which are adapted to be engaged by complementary wedge surfaces 320 and 321 formed on the inner end of sildable locking plungers 322 and 323, respectively. The locking plungers 322 and 323 are slidably disposed within transverse bores 324 and 325. As depicted in FIG. 11, the locking plunger 322 is normally urged inwardly to maintain engagement with the plunger 312 by means of a spring 326 which is disposed in the bore 324 in abutting engagement with a threaded plug 327 and the end of the locking plunger 322. Actuation of the plungers 322 and 323 into and out of locking engagement with the workpiece plungers 312 and 313 is accomplished by means of crank member 328. The crank 328 is journalled on a tubular stub shaft 329 that is fixedly secured in the workpiece change housing 314. The crank 328 is provided with oppositely extending arms 330 and 331, each of which is provided with slots 332. The slots 332 in each of the arms 330 and 331 are adapted to engage with laterally extending studs 333 and 334 that are threadedly engaged in the side of each of the locking plungers 322 and 323, respectively. With this arrangement rotation of the crank 328 in a clockwise direction, as viewed in FIG. 11, will serve to move the upper arm 330 rightwardly and simultaneously move the lower arm 331 leftwardly. As a result, the locking plungers 322 and 323 are moved simultaneously, rightwardly and leftwardly, respectively, to retracted positions to release the grip plungers 312 and 313. As a result, the plungers 312 and 313 are yieldably maintained in their outward positions solely by means of their associated springs, of which the spring 315 associated with the grip plunger 312 is shown. With this condition obtained and with the workpieces clamped in the headstock spindle 41 and the set up device 305, the arm 306 may be rotated in a clockwise direction, as viewed in FIG. 2, to effect the disengagement of the grips 308 and 309 from the workpieces. On the other hand, when the arm 306 is rotated from its vertical "parked" position, depicted in FIG. 2, in a counterclockwise direction, as viewed in FIG. 2, to engage the grips 308 and 309 with the workpieces carrying fixture rings or adaptors 275 and 275A presented by the set up device 305, and the spindle 41, the crank 328 will be rotated in a counterclockwise direction, as viewed in FIG. 11, thereby moving the respective locking plungers 322 and 323 into camming engagement with the respective grip plungers 312 and 313 to lock the workpieces to the grips for the subsequent interchange movement of the workpieces.

Operation of the crank 328 is effected by means of a fluid actuator 335 comprising a cylinder 336 in which a piston 337, shown diagrammatically in FIG. 14, is reciprocally supported. The piston 337 is provided with a piston rod 338 which extends outwardly of the cylinder 336. The extending end of the piston rod 338 is secured to an arm portion 339 of the crank 328, as depicted in FIG. 11, and the cylinder 336 is pivotally secured to a suitable bracket provided within the arm housing 314. Pressure fluid supplied to the rod end of the cylinder 336 will effect the counterclockwise rotation of the crank 328 to positively lock the plungers 312 and 313 in outward extended positions, thereby locking the workpieces within the grips 308 and 309. On the other hand, when the rod end of the cylinder 336 is connected to exhaust and pressure fluid is supplied to the head end of the cylinder 336, the crank 328 will be caused to rotate in a clockwise direction thereby effecting a release of the plungers 312 and 313.

To indicate whether the plungers 312 and 313 are in locked or unlocked condition, there is provided a cam member 340 that is secured to the upper arm 330 of the crank 328. The cam member 340 is positioned with respect to the actuating plunger of a limit switch 341 in a manner that when the arm 330 is in the position, depicted in FIG. 11, wherein the locking plungers 322 and 323 are in camming engagement with the grip plungers 312 and 313, respectively, the cam member 340 does not engage the operating plunger of switch 341. With this condition obtained, the switch 341 operates to provide a signal to indicate that the grip plungers 312 and 313 are locked.

However, when the crank 328 is caused to rotate in a clockwise direction to effect a retraction of the locking plungers 322 and 323, to release the grip plungers 312 and 313, the cam member 340 is moved into engagement with the operating plunger of the switch 341 to actuate the switch, and the switch will operate to provide a signal to indicate that the grip plungers are released.

The workpiece change arm 306, as previously mentioned, is supported for rotation to effect an interchange of workpieces between the headstock spindle 41 and the set up device 305. To this end, the workpiece change arm 306 is secured to the end of a hollow shaft 342, as shown in FIG. 10. The shaft 342 is rotatably supported in bearings 343 and 344 carried in suitable recesses provided in a cylindrical carrier 345 which, in turn, is secured to the upstanding bracket 307. A driving connection between the arm 306 and the drive shaft 342 is established by means of a key 346. Rotation of the shaft 342 and thereby the workpiece change arm 306 is effected by means of a reversible fluid motor 347 which is supported on a gear box 348 that is secured to the end of the carrier 345. The motor 347 has a driveshaft 349 that extends inwardly into a compartment 351 formed in the gearbox 348. A spiral pinion 352 which is mounted on and keyed to the driveshaft 349 is disposed in meshing engagement with a larger spiral gear 353 that is mounted on and keyed to a reduced portion of the hollow driveshaft 342, as depicted in FIG. 10.

To indicate in the electrical control system the position of the workpiece change arm 306, a pair of switches 355 and 356 are provided. These switches are suitably mounted within a compartment 357 that is formed in the carrier 345 with the access opening of the compartment 357 being closed by a suitable cover 358.

The switch 355 is operable when actuated in one direction by either a dog 359 or a dog 361 which are secured on the shaft 342 in diametrically opposite relationship. With the workpiece change arm 306 in the vertical "parked" position wherein the grip 308 is in the uppermost position, the dog 359 will be positioned to actuate the switch 355. When the workpiece change arm 306 is rotated in a first cycle of operation to effect an interchange of workpieces between the set up device 305 and the headstock spindle 41, the workpiece change arm 306 is rotated in a counterclockwise direction, as viewed in FIG. 2, from the vertical "parked" position to a horizontal position. With the arm 306 in a horizontal position the grip 308 is engaged with a fixture ring 275A secured to the set up device 305 while the grip 309 is engaged with the fixture ring 275 secured to the headstock spindle 41. With the workpiece change arm 306 in a horizontal position, a dog 362, depicted by broken lines in FIG. 10, secured on the shaft 329 to rotate with the shaft will be positioned to actuate the switch 356. The switch 356 upon being actuated in the one direction by the dog 362 will operate to provide a signal to indicate that the arm 306 is in the horizontal position. To effect an interchange in the position of the workpieces secured to the fixture rings 275 and 275A, the arm 306 is rotated 180° in a clockwise direction, as viewed in FIG. 2, from the horizontal position wherein the grip 308 thereof is adjacent the set up device 305 to a horizontal position wherein the grip 308 with the fixture ring 275A and the new workpiece secured thereto is positioned in axial alignment with the headstock spindle 41. As the arm 306 is rotated 180°, the dog 362 moving with the shaft 342 will move past the switch 356 releasing the operating arm of the switch and thereby releasing the switch to a neutral position. With the workpiece change arm 306 rotated 180° wherein the grip 308 with the new workpiece is moved into alignment with the headstock spindle 41, a dog 363 which is secured to the shaft 329 diametrically opposite the dog 362, will be positioned to engage the operating arm of the switch 356. This engagement of the dog 363 with the operating arm of the switch 356 will move the switch operating arm in the same direction as it was moved by the dog 362. Thus, the switch 356 is again actuated to indicate that the workpiece change arm 306 is in a horizontal position.

After a workpiece interchange operation has been accomplished, the workpiece change arm 306 will be rotated 90° in a clockwise direction, as viewed in FIG. 2, to move the arm from the horizontal position back to a vertical "parked" position. Under this condition, the dog 361 will be positioned to move the operating arm of the switch 355 in the same direction as it was moved by the dog 359. Thus, the switch 355 is again actuated and operates to provide a signal to indicate that the arm is in vertical "parked" position. It is to be noted that the workpiece change arm 306 is rotated in a counterclockwise direction, as viewed in FIG. 2, to move it from the vertical "parked" position to a horizontal workpiece engaging position and is also rotated in a counterclockwise direction to effect a tool interchange movement. In doing this, it will be appreciated that the switch 355 will be actuated in an opposite direction by one or the other of the dogs 359 and 361, and this actuation of the switch is utilized for another function to be described.

The workpiece change arm 306 is positively located and held in vertical "parked" positions and in the horizontal positions. To this end a shot pin mechanism 471 is provided and it is operable to hold the change arm 306 in the desired positions. As depicted in FIG. 10, the shot pin mechanism comprises a cylinder 472 that is carried on a bracket 473 which, in turn, is secured to the upstanding main bracket 307. As diagrammatically depicted in FIG. 14, a piston 474 is supported for reciprocal movement in the cylinder 472 and is provided with a piston rod 475 that extends outwardly of the cylinder. The free end of the rod 475 is provided wtih a shot pin 476 that is adapted to register in associated locating recesses 477, 478 and 479 formed in the periphery of a rearwardly extended hub 465 of the change arm 306 and also a fourth recess located on the opposite side of the hub 465 diametrically opposite the recess 478. When the change arm 306 is operated in a workpiece interchange operation and is moved from a vertical "parked" position to a horizontal position to engage the grips 308 and 309 with the workpiece carrying fixture rings 275 and 275A, the shot pin mechanism 471 will be operated to withdraw the shot pin from the locating recess 477. With the shot pin 476 retracted out of the "parked" position recess 477, a dog 458 attached to the side of the piston rod 475 will be moved downwardly, thereby releasing the operating plunger of a switch 459. With the operating plunger of the switch released, the switch 459 will operate to provide a signal to indicate that the workpiece change arm 306 is released. When the arm 306 is in a horizontal position wherein the grip 308 is engaged on the fixture ring 275A and the grip 309 is engaged on the fixture ring 275, the shot pin mechanism 471 will again be operated to move the shot pin 476 into the locating recess 478 which, when the arm 306 is in the horizontal position described, it will be in a vertical plane in axial alignment wtih the pin 476. With this condition obtained the arm 306 is positively held in the horizontal position. With the shot pin 476 in registration with the locating recess 478, the dog 458 will be moved into position to actuate the operating plunger of the switch 459. Thereupon the switch 459 operates to provide a signal to indicate that the change arm 306 is locked.

Assuming now that the workpiece carrying fixtures 275A and 275 have been released to the grips 308 and 309 respectively, as will be described hereinafter, the arm 306 will be rotated 180° in a counterclockwise direction to effect an interchange in the position of the workpieces. To this end the shot pin mechanism 471 will again be operated to retract the shot pin out of the recess 478. As the arm 306 completes 90° of angular movement, the dog 361 will be positioned to engage the operating arm of the switch 355 moving the arm from a centered neutral release position in a second direction. With the operating arm of the switch 355 moved in a second direction, the switch will operate to provide a signal to indicate that the arm 306 has completed one-half of the required 180° of interchange rotation. As a result, the shot pin mechanism 471 will again be operated to move the shot pin upwardly. However, at this time the locating recess 479 will now be out of alignment with the shot pin 476. Thus, the shot pin 476 will ride the peripheral surface of the hub 465. When the workpiece change arm 306 has been rotated a complete 180° in an interchange movement, the shot pin 476, which is constantly urged upwardly, will enter into the locating recess (not shown) that is located diametrically opposite the recess 478. With this condition obtained, the change arm 306 will be located in a precise horizontal position wherein the fixture ring 275A with a new workpiece NW thereon in the grip 308 will be positioned in axial alignment with the headstock spindle 41. Also, the fixture ring 275 with the previously machined workpiece W in the grip 309 will be positioned in axial alignment with the set up device 305. With the shot pin in positioning registration in the change arm 306, the switch 459 will again be actuated, as previously described, to indicate that the arm 306 is locked.

After the change arm 306 has operated in a workpiece interchange movement and the grips 308 and 309 unclamped, the change arm 306 will be rotated 90° in a clockwise direction, as viewed in FIG. 2, from the horizontal workpiece interchange position to a vertical "parked" position. To this end, the shot pin mechanism 471 is operated to retract the shot pin 476. Thereafter the change arm 306 is rotated from the horizontal workpiece interchange position 90 in a clockwise direction. As the rotation of the arm 306 in a clockwise direction is initiated, the dog 363 rotating with the shaft 342 will be moved out of engagement with the switch 356 thereby releasing the switch. With the switch 356 released, it will operate to provide a signal to effect the operation of the shot pin mechanism 471. As a result, the shot pin 476 will engage on the periphery of the rotating arm hub 465. With the arm 306 returned to the vertical position, the shot pin will enter into registry with the locating recess 479 to lock the change arm 306 in the vertical "parked" position.

The set up device 305, FIGS. 1 and 12, which is operable to present a new workpiece for engagement by the workpiece change arm 306 for subsequent transfer to the headstock spindle 41, comprises essentially an upstanding supporting base 367 which is fastened to the side of the machine bed 30. On its upper surface the supporting base 367 is adapted to support a frame or carrier 368 thereon for pivotal movement about an axis 369 which is disposed transversely of the axis of the headstock spindle 41. Pivotal movement of the frame 368 about the axis 369 is effected by operation of a pair of fluid actuators 371 and 372, which are disposed on either side of the base 367 and that are connected to the respective left and right sides of the frame 368, as shown in FIG. 2. The actuators 371 and 372 are identical and comprise cylinders 371A and 372A which are pivotally secured in yoke members 373 and 374, respectively, that are secured to the side of the base 367. Each cylinder 371A and 372A is provided with a piston 376; the piston 376 that is associated with the actuator 371, is depicted diagrammatically in FIG. 14. As shown, the piston 376 is reciprocally supported within the cylinder 371A and is provided with a piston rod 377 that extends outwardly of the cylinder 371A and is coupled to a bracket 378. The bracket 378 is provided with a bore 379 which receives the outwardly extending end of the stub shaft 381 that is rigidly mounted in the left side of the frame 368. The fluid actuator 372 is similarly constructed and arranged so that both the fluid actuator 371 and the fluid actuator 372 operate simultaneously to effect the pivotal movement of the frame 368 about the axis 369. With the arrangement described, the fluid actuators 371 and 372 will adjust bodily as they are operated to effect the pivotal movement of the frame 368 about the axis 369.

The pivotal frame 368 comprises a body portion 382 provided with a pair of laterally extending spaced arms 383 and 384 which are disposed so as to extend on each side of a head block 386 of a bracket 387. The bracket 387 is secured to the side of the base 367 and is arranged to extend upwardly therefrom to project the head block 386 above the horizontal supporting surface 388 of the base 367. Axially aligned bores are formed in the ends of the arms 383 and 384 and the head block 386 and receive a shaft 389 about which the frame 368 pivots when operated by the fluid actuators 371 and 372. As depicted in FIG. 12, the body portion 382 of the frame 368 is provided with an axial bore 390 in which a quill 391 is supported for axial movement. A spindle 392 having a head portion 393 is rotatably supported in the quill 391, in antifriction bearings 394 and 395. The quill 391 is slidably supported in the bore 390 for axial movement to cause a like axial movement of the spindle 392 and its associated spindle head 393 for moving the spindle head 393 into and out of engagement with a workpiece carrying fixture ring such as the fixture ring 275A. A key 396 carried by body portion 382 of the frame 368 is engaged in a longitudinally extending keyway 397 formed in the periphery of the quill 391 and operates to restrain the quill 391 against rotation while permitting its axial movement within the bore 390.

The position of the frame 368 is indicated by means of a pair of switches 467 and 468 each of which upon being actuated will operate to provide a signal. Thus, when the frame 368 is moved to the position depicted in FIG. 12, wherein the spindle 392 is in a horizontal plane, a dog 469 carried on the end of the arm 383 will be positioned in engagement with the operating plunger of the switch 467, as depicted in FIG. 12, to actuate the switch. With the switch 467 actuated, it will operate to provide a signal which will indicate that the set up device spindle 392 is in the horizontal plane. On the other hand, when the frame 368 is returned to the load position wherein it is seated on the top surface 388 of the supporting base so that the set up device spindle 392 is disposed with its axis in the vertical plane, a dog 470, shown in FIG. 1, which is carried on the lower edge of the body portion 382 of the frame 368 will be positioned in engagement with the operating plunger of the switch 468 to actuate the switch. The switch 468 when actuated will operate to provide a signal to indicate that the spindle 392 is in the vertical "load" position.

The set up device spindle 392 is similar to the headstock spindle 41 and, as shown in FIG. 12, extends outwardly of the body portion 382 of the frame 368. The extending end of the spindle 392 is provided with the enlarged circular head portion 393 that is formed with an annular recess 397 and in which a ring 398 is fixedly mounted in concentric relationship. The ring 398 is provided with circumferentially spaced, radially formed angular clutch teeth 399 adapted to have meshing engagement with complementary clutch teeth 401 formed on another ring 402 which is secured to a fixture ring 275A. The fixture ring 275A is similar in all respects to the fixture ring 275 previously described and is adapted to be engaged on the head portion 393 of the spindle 392. To this end, the fixture ring 275A is provided with an internal circular recess 276A having a coaxial counterbore 277A in which the ring 402 is secured. With this arrangement, the fixture ring 275A may be engaged on the spindle head 393 and when so engaged the teeth 401 of the ring 402 will mesh with the teeth 399 on the ring 398 which is associated with the head 393. As a result, the fixture ring 275A will be centered with respect to the spindle head 393 so that the axis of the fixture ring 275A will coincide with the axis of the spindle 392. It will be noted that the spindle head 268 of the headstock spindle 41 and the spindle head 393 associated with the set up device spindle 392 are identical. The fixture rings 275 and 275A are likewise identical. As a result, the fixture ring 275 will engage and center on the fixture head 393 and, likewise, the fixture ring 275A will engage and center on the spindle head 268.

The fixture ring 275A is provided with a chuck mechanism 277A having a plurality of radially movable clamp members 278A similar to the clamp members 278 associated with the chuck 278 that is carried by the fixture ring 275. Thus, the workpiece NW, shown in FIGS. 1 and 2, may be secured to the fixture ring 275A by operation of the chuck mechanism tool 277A in a well-known manner.

To clamp the fixture ring 275A with the workpiece NW to the set up device spindle head 393, a plurality of radially movable clamp elements or members 406 are provided in the spindle head 393. The clamp members 406 are pivotally movable into clamping engagement with an annular clamp surface 407 formed on the inner surface of the annular ring 402 associated with the fixture ring 275A. The clamp members 406 are similar and each is provided with a pair of laterally extending studs 408 which are seated in concave recesses formed on either side of circumferentially spaced, radially formed slots 409 that are formed in the axial face of an internal central hub 410 provided within the spindle head 393. A cap 411 having an internal bore 412 is secured to the axial end face of the central hub portion 410 of the spindle head 393. The cap 411 is provided with a plurality of radial slots 413 equal in number to the number of clamp members 406 and through which the clamp members 406 extend when they are moved into clamping engagement with the annular clamp surface 407 formed on the ring 402 that is associated with the fixture ring 275A. The cap 411 is also provided with semi-circular recesses which are formed on either side of each of the slots 413 and that are disposed to engage the lateral studs 408 of the clamp members 406. Thus, the cap 411 serves as a bearing cap for retaining the clamp members 406 in operative position in the radial extending slots 413 of the cap 411 and the cooperating mating slots 409 formed in the central hub portion 410 of the spindle head 393. Each clamp member 406 is provided with a notched portion which forms a shoulder 414 that is engaged by the flanged head of an axially movable sleeve 415. The sleeve 415 is slidable on a bolt 416 which is threadedly engaged in the cap 411 in coaxial alignment with the axis of the spindle 392. A spring 417 acting between the bottom of the bore 412 and the radial flange formed on the sleeve 415 serves to bias the sleeve 415 axially outwardly of the cap bore 412 into forceful engagement with the shoulders 414 formed on the clamp members 406. Thus, the clamp members 406 through the operation of the spring 417 and the sleeve 415 are normally urged radially inwardly within the slots 413 of the cap 411.

Assuming for the moment that the fixture ring 275A, depicted in FIG. 12, is disposed in engagement with the set up device spindle head 393, the fixture ring 275A will be clamped thereon by operation of the clamp members 406. To effect the outward pivotal movement of the clamp members 406 into clamping engagement with the annular clamp surface 407 of the ring 402 associated with the fixture ring 275A, there is provided an axially movable actuating rod 418 which is supported for reciprocal movement in an axial bore 419 formed in the spindle 392. Axial movement of the rod 418 in either direction is effected by means of a piston 421 that is secured to the inner extending end of the actuating rod 418. The piston 421 is reciprocally supported within an enlarged portion of the bore 419 which is closed at one end by a seal 422 and at its opposite end by a manifold cap 423 that is secured to the axial end face of the inner end of the spindle 392. A spring 424 disposed within an axial recess formed in the manifold cap 423 and an axial recess 427 formed in the piston 421 normally operates to urge the piston 421 and thereby the actuating rod 418 rightwardly, as viewed in FIG. 12. The force applied by the spring 424 to the piston 421 is sufficient to effect outward pivotal movement of the clamp members 406 and to maintain the clamp members 406 in clamped engagement with the clamp surface 407 of the ring 402 associated with the fixture ring 275A. In this manner the clamp members 406 are operable to retain the fixture ring 275A with a workpiece in position on the spindle head 393 in the event that the hydraulic power is inadvertently interrupted.

To effect a positive clamp engagement of the fixture ring 275A to the spindle head 393, fluid pressure is supplied to the head end of the piston 421 via a passage 428 formed in the manifold cap 423. The passage 428 is in communication with a passage 429 formed in a stationary manifold 430. The manifold 430 is secured by suitable means (not shown) to the axial end of the quill 391 and moves axially with the quill. The pressure fluid supplied to the head or left end of the piston 421 and the force applied by the spring 424 on the piston 421 operates to effect the rightward movement of the actuating rod 418 into engagement with the inwardly extending ends of the clamp members 406 to urge them outwardly of the cap 411 and into forceful engagement with the clamp surface 407 on the ring 402 associated with the fixture ring 275A.

On the other hand, to effect the retraction or leftward movement of the rod 418, as viewed in FIG. 12, to effect a release of the clamp members 406, pressure fluid is supplied to the rod end of the piston 421 via a passage 431 formed in the spindle 392. The pressure fluid is supplied to the passage 431 via a passage 432 formed in the manifold cap 423 which, in turn, has communication with a passage 433 formed in stationary manifold 430 that is secured to the left end of the quill 391. As the actuating rod 418 moves leftwardly to release the clamp members 406, the spring 417 in the cap 411 will expand, moving the sleeve 415 leftwardly on the bolt 416 and into engagement with the shoulders 414 formed on the clamp members 406. This engagement of the sleeve 415 with the shoulders 414 of the clamp members 406 will serve to effect pivotal inwardly movement of the clamp members 406 within the cap 411 into a non-interfering position so that the fixture ring 275A may be removed from the spindle head 393.

To indicate whether the clamp elements 406 have been actuated so as to clamp the fixture ring 275A to the set up device spindle 392 or have been actuated to unclamp the fixture ring, there is provided a switch 434, depicted in FIGS. 12 and 14. As shown in FIG. 12 the switch 434 is secured to a bracket 445 which, in turn, is secured to the manifold 430. The switch 434 is disposed so that its operating arm is in position to be engaged by the end of a rod 435. The rod 435 is secured to the piston 421 and extends through suitable aligned openings provided in the cap 423 and the bracket 445. With this arrangement when the piston 421 is positioned to its full limit of leftward travel wherein it has moved the clamp element actuating rod to a retracted position to thereby release the clamp elements 406, the rod 435 will be positioned to engage the operating arm of the switch 434 to actuate the switch. The switch 434 when actuated operates to provide a signal to indicate that the fixture ring 275A is unclamped.

On the other hand, upon movement of the piston 421 to its limit of rightward travel to thereby effect the pivotal movement of the clamp elements 406 into clamping engagement with the fixture ring 275A, the rod 435 moving with the piston 421 will be moved sufficiently far enough to release the operating arm of the switch 434. The switch 434 upon being released will operate to provide a signal to indicate that the fixture ring 275A is clamped to the spindle head 393.

Assuming that the clamp members 406 have been actuated in an unclamping movement and that the workpiece change arm 306 is in engagement with the fixture ring 275A and that it is now desired to effect an interchange of the workpieces carried by the fixture ring 275 and the fixture ring 275A, the spindle head 393 must be retracted to leave the fixture ring 275A in the possession of the grip 308 of the change arm 306 and to clear the cap 411 beyond a line which would be tangent to the teeth 401 of the ring 402 associated with the fixture ring 275A. To this end, the quill 391 is moved leftwardly within the supporting frame 382 to the position depicted in FIG. 12. Axial movement of the quill 391 is effected by means of a fluid actuator 440 comprising a cylinder 441 which is secured to a web portion 442 that extends between the arms 383 and 384 of the quill supporting frame 368. A piston 443, shown diagrammatically in FIG. 14, is reciprocally supported within the cylinder 441, and has a piston rod 444 which extends outwardly of the left end of the cylinder 441 and through an opening formed in the web portion 442. The leftwardly extending end of the piston rod 444 is coupled to the bracket 445 which is secured to the left end of the quill 391 so as to move with the quill.

To retract the quill 391 to the position depicted in FIG. 12, and thereby effect disengagement between the spindle head 393 and the fixture ring 275A, pressure fluid will be supplied to the head end of the piston 443 via a fluid line 446 so that the piston 442 is moved leftwardly within the cylinder 441, thereby effecting the leftward retracting movement of the quill 391 to the position it occupies as depicted in FIG. 12. On the other hand, when the workpiece change arm 306 is again in the horizontal position wherein an interchange of workpieces between the set up device 305 and the headstock spindle 41 has been effected, the quill 391 must be moved rightwardly, as viewed in FIG. 12, from its retracted position into an advanced position wherein the fixture head 393 will engage the fixture ring presented by the workpiece change arm 306. To effect such a movement, pressure fluid is supplied to the rod end of the cylinder 441 via a fluid line 447. Pressure fluid to the rod end of the cylinder 441 will force the piston 443 rightwardly within the cylinder, thereby effecting rightward movement of the quill 391 to engage the spindle head 393 with the fixture ring presented by the workpiece change arm 306.

To indicate the position of the spindle head 393 with respect to whether it is in its retracted position, as depicted in FIG. 12, or is in full extended rightward position, a double acting switch 450 is provided. As shown in FIG. 12, the switch 450 is mounted on the web portion 442 of the quill supporting frame 368 and is arranged in a manner so that the end of its operating plunger 451 extends into an opening 452 formed in the web 442. Actuation of the switch 450 is accomplished by means of a rod 453 that is secured to the extending end of the bracket 445. With the quill 391 moved to an advanced position to engage the spindle head 393 with the fixture ring 275A, the rod 453 moving with the bracket 445 will enter the opening 452 and engage the operating plunger 451 of the switch 450 to actuate the switch. The switch 450 upon being actuated will operate to provide a signal to indicate that the spindle head is in full forward or advanced position. On the other hand, when the quill 391 is moved leftwardly to the retracted position, as depicted in FIG. 12, the rod 453 moving with the quill 391 will release the operating plunger 451 of the switch 450 so that the switch returns to its normal position. With the switch 450 in its normal position it will provide a signal to indicate that the head 393 is in a full retracted position.

The set up device 305 serves not only to position a new workpiece in the path of travel of the workpiece change arm 306 for subsequent transfer to the headstock workholding spindle 41, but also provides facilities whereby a workpiece may be orientated with respect to the fixture ring 275 or 275A at a time prior to it being transferred to the headstock spindle 41. This means that the operator may at his convenience, and without interrupting the operation of the machine proper, orientate a new workpiece on the fixture ring 275 or 275A while the tool operator 63 is operating on a workpiece in the headstock spindle 41. With the set up device 305 the spindle head 393 may be bodily rotated about its axis to position a fixed reference point 454 with respect to a particular reference mark 455 provided on the body portion 382 of the supporting frame 368 so that, upon subsequent transfer of the fixture ring 275A from the set up device 305 to the headstock spindle 41, the fixture ring 275A will be positioned in a predetermined angular position with respect to the headstock spindle head 268. To this end, with the support 368 returned to the vertical "load" position on the base 367, as depicted in FIGS. 1 and 2, the chuck 278A will be operated to release a previously machined workpiece so that it may be removed in any suitable manner from the chuck mechanism. A new workpiece will be inserted into the chuck mechanism 278A while the chuck mechanism and the associated fixture ring 275A are on the set up device spindle head 393. The workpiece may then be adjusted radially so that it may be bodily orientated relative to the axis of the set up device spindle 391 and also angularly adjusted so that a selected reference point (not shown) on the workpiece may be positioned with respect to the reference mark 454 on the spindle head 393. When this is accomplished the chuck mechanism 278A will be operated to securely clamp the adjusted workpiece in the chuck mechanism. In this manner the workpiece will be centered with respect to the axis of the fixture ring 275A and upon the subsequent transfer of the fixture ring with the workpiece thereon to the headstock spindle 41, the workpiece will be orientated with respect to the axis of the work spindle 41. In addition, should it be necessary that the workpiece be located in the headstock spindle 41 when transferred thereto in a predetermined angular position, the fixture ring 275A with the adjusted workpiece thereon may be angularly adjusted to align the reference mark 454 on the spindle head 393 with the reference mark 455 on the body portion 382 of the set up device supporting frame 368. The mark of 454 provided on the periphery of the spindle head 393 is related to a notch 456 formed in the peripheral surface of the manifold cap 423 which is secured to the axial end of the spindle 391. A shot pin 457 is movable in a bore 458 formed in the manifold 430 which is secured to the quill 391. Thus, when the spindle 392 is rotated to align the reference mark 454 with the reference mark 455 the notch 456 will be positioned in alignment with the bore 458 in the manifold 430. The shot pin 457 may be moved rightwardly in the bore 458 into engagement with the notch 456 to lock the spindle 392 angularly with respect to the quill 391. Since the key 396 engaged in the keyway 397 operates to prevent rotation of the quill 391, the spindle 392 will be located in a predetermined angular position. With this condition obtained, the fixture ring 275A with the workpiece secured thereto will, by operation of the workpiece change arm 306, be transferred to the headstock spindle 41 and positioned in a predetermined angularly orientated position with respect to the headstock spindle head 268. To actuate the shot pin 457 into engagement with the spindle 392, there is provided the fluid actuator 460 comprising a cylinder 461 that is mounted on the outer surface of the manifold 430. A piston 462, depicted in FIG. 14, is reciprocally supported within the cylinder 461 and is provided with a piston rod 463 which extends outwardly of the cylinder and is threadedly connected to the shot pin 457, as depicted in FIG. 12. Whenever pressure fluid is supplied to the head end of the piston 462 via a line 464, the piston 462 will be moved rightwardly within the cylinder 461, as viewed in FIG. 14, to move the shot pin 457 into locating engagement in the notch 456 in the spindle 392. On the other hand, to retract the shot pin 457, the line 464 is connected to the reservoir and pressure fluid is supplied to the rod side of the piston 462 via a line 466.

The various hydraulic operating devices of the machine tool depicted herein are connected in a hydraulic circuit which is shown diagrammatically in FIGS. 13 and 14. Referring first to FIG. 13, operating pressure is provided by a pump 480 which is adapted to be driven by a motor 481. The pump withdraws fluid from a reservoir 482 and supplies it at high pressure to a line 483 which is connected back to a reservoir through a relief valve 484 thereby regulating the pressure in the line 483. The motor 481 is also connected to operate a pump 485 which is likewise connected to withdraw fluid from the reservoir 482 and supply it at a lower pressure to a line 486 which is connected back to the reservoir through a relief valve 487 which operates to regulate the pressure in the line 486. The main supply line 486 is connected to direct the pressure fluid into two branch supply lines 488 and 489 as diagrammatically illustrated in FIG. 13. The branch supply line 488 serves to supply the various hydraulic components depicted in FIG. 14 with low pressure fluid.

The operation of the various hydraulic components with their associated control valves will be described in conjunction with the operation of the various components as their operation is initiated in a manual mode by the operator actuating selective ones of a plurality of push button switches operatively arranged on an electrical control console 490 that is associated with the machine depicted in FIGS. 1 and 15.

To effect the operation of the various components in an automatic mode under the control of signals obtained from the record or tape 539, a selector switch 501 will be moved to "auto" position. With the selector switch 501 in "auto" position the operator will momentarily depress a cycle start push button switch 502 which will effect the operation of the tape reader 540 to advance the tape 539 for obtaining the necessary control signals.

However, when the machine is to be operated in a manual mode by the operator he will move the mode selector switch 501 into "man" position. With the selector switch in "man" position the various switches on the console 490 are made operable to initiate the desired movements of the various components.

The operation of the tool change arm 146 in effecting a tool interchange between the tool operator 63 and the magazine 145 will first be described. Prior to effecting a tool change cycle of operation certain initial conditions will assume to have been accomplished in that the tool operator slide 62 has been moved to its "home" position and the tool operator 63 is in the "bore" position, as depicted in FIG. 1. It will also be assumed that the headstock 31 has been retracted to its "home" position. With these three initial conditions satisfied, the switch 84 will be actuated to indicate that the tool operator 63 is in the "bore" position and the switch 86 will be actuated to indicate that the tool operator 63 is clamped. Also, with the tool operator slide 62 in a "home" position the switch 141 will be actuated, and with the headstock 31 in its "home" position a dog 492, FIGS. 1 and 13, will be positioned to actuate a switch 491.

As previously mentioned, with these conditions obtained the operator will actuate a tool change push button switch 80 to initiate a tool change cycle of operation. With the switch 80 depressed it will operate to effect the energization of a solenoid 504 associated with a control valve 505 and the valve 505 will be operated to direct pressure fluid supplied in a branch supply line 506 into the line 181 which is connected to the rod side of the cylinder 176. The pressure fluid supplied to the rod side of the cylinder 176 will operate the piston 177 therein to effect the extension of the tool grips 151 and 152 into engagement with a tool in the magazine 145 located at the ready station 148 and with the tool in the tool operator 63. When the grips are in extended position the switch 183 will be actuated by the dog 182.

With the switch 183 actuated it will operate to effect the energization of a solenoid 509 associated with a control valve 510 and the valve is operated to direct the pressure fluid obtained from the supply line 488 into the connected line 124. Pressure fluid flowing in the line 124 will be directed to the rod sides of the pistons 116 and 129 associated with the two clamping mechanisms of the tool operator 63. The pressure fluid supplied to the rod sides of the pistons 116 and 129 will serve to move the pistons upwardly thereby effecting a release of the tool in the tool operator 63. As the tool is released by the upward movement of the pistons 116 and 129, the switch 132 will be actuated in a counterclockwise direction, as viewed in FIG. 14. Counterclockwise actuation of the switch 132 will serve to effect the energization of a solenoid 512 associated with a fluid control valve 513 which is connected to control the actuator 200. With the solenoid 512 energized, the valve 513 will be operated to direct pressure fluid from the branch supply line 506 to the cylinder 201 at the head side of the piston 202 therein. The pressure fluid acting on the head side of the piston 202 will move the piston 202 leftwardly within the cylinder thereby effecting the outward movement of the tool change arm 146 to withdraw a tool from the magazine 145 and from the tool operator 63. When the tool change arm 146 is moved to its fully extended position, the switch 215 will be actuated in a clockwise direction by the dog 217, shown in FIG. 14, as being carried on a leftward extending rod associated with the piston 202. With the switch 215 actuated by the outward movement of the arm 146, it will operate to effect the energization of a solenoid 514 associated with a control valve 515. The valve will be operated to direct pressure fluid from the branch supply line 506 into a connected line 517 which, in turn, is connected to the cylinder at the left end of the piston 212. The pressure fluid supplied to the left end of the piston 212 will effect the rightward movement of the piston to thereby effect the clockwise rotation of the tool change arm 146. Exhaust fluid from the cylinder at the right end of the piston 212 will flow into a line 518 and by operation of the valve will flow into a return line 519 which, in turn, is connected to a main return line 520 that is connected to an auxiliary reservoir 482. The rightward movement of the piston 212 will serve to effect the rotation of the tool change arm 146 180° in a clockwise direction thereby interchanging the position of the tools secured in the grips 151 and 152. When the arm has been rotated 180° in a tool interchange movement, the operating arm of the switch 220 will be actuated upwardly by the dog 222, as viewed in FIG. 4, or in a clockwise direction, as viewed in FIG. 14. With the switch 220 actuated in a clockwise direction, the solenoid 512 associated with the valve 513 will be de-energized so that the valve is returned to its normal position. The valve 513 now operates to direct pressure fluid from the line 506 to the left end of the cylinder 201 thereby effecting rightward movement of the piston 202 to retract the tool change arm 146. Retraction of the tool change arm 146 will operate to insert the previously used tool from the tool operator 63 into the magazine 145, while the new tool obtained from the magazine will be inserted into the tool operator 63. With the arm 146 in full retracted position the switch 215 will be actuated by the dog 216 in a counterclockwise direction and it will operate to effect the de-energization of the solenoid 509 associated with the valve 510. With the solenoid 509 de-energized, the valve 510 will operate to return to its normal position, as depicted in FIG. 14, whereby it operates to direct pressure fluid into the line 121 so that the pressure fluid will act to effect the sequential downward movement of the pistons 116 and 129 to locate and clamp the new tool placed in the tool operator 63 as previously described. As the piston 116 moves downwardly to effect the clamping of the tool in the tool operator 63, the switch 132 will be actuated in a clockwise direction and it will operate to effect the de-energization of the solenoid 504 associated with the valve 505. With the solenoid 504 de-energized, the valve will operate to return to its normal position wherein it operates to direct pressure fluid from the supply line 506 into the line 184 which is connected to the lower end of the cylinder 176. The pressure fluid supplied to the lower end of the cylinder 176 will serve to move the piston 177 upwardly thereby effecting the retraction of the tool grips 151 and 152 inwardly into the arm housing and out of engagement with the tools. With the grips retracted, the switch 186 will be operated to provide a signal to indicate that the tool grips are fully retracted.

Upon the completion of the tool change operation, the arm 146 will be in a vertical position wherein the grip 152 will now be in the uppermost position and the grip 151 will be located in the lowermost position. Thus, in the next tool change operational cycle the arm 146 will be rotated 180° in a counterclockwise direction. To effect the counterclockwise rotation of the arm 146 the clockwise actuation of the switch 215, as previously described, will operate to effect the energization of a solenoid 521 associated with the control valve 515. With the solenoid 521 energized, the valve 515 will operate to direct pressure fluid into the line 518. Pressure fluid in the line 518 will be supplied to the right end of the piston 212 causing it to move leftwardly and thereby rotate the tool change arm 146 in a counterclockwise direction. Thus, in one cycle of a tool change operation the solenoid 514 solenoid 514 associated with the valve 515 will be energized to effect clockwise rotation of the arm 146. In the next tool change cycle of operation the solenoid 521 will be energized to effect the counterclockwise rotation of the arm 146.

Assuming now that the operator desires to effect the positioning movement of the tool operator 63 from the "bore" position which it occupies, as shown in FIG. 1, to a "turn" position wherein the axis of the tool will be transversed to the axis of the headstock spindle 31. To this end, the frame 71 must first be elevated to unclamp it from the base 70 prior to its being rotated from the "bore" position to the "turn" position. To effect such unclamping of the frame 71 the operator will depress a switch button 525 operatively located on the console 490. With the push button switch 525 depressed it will operate to effect the energization of a solenoid 526 that is associated with a control valve 527, as shown in FIG. 14. The valve 527 is connected to receive pressure fluid from the branch supply line 506 via a line 528. With the solenoid 526 energized the valve will be operated to direct pressure fluid from the pressure line 528 into the connecting line 102 which is connected to the lower end of the cylinder 98. The pressure fluid supplied to the lower end of the cylinder 98 will effect the upward movement of the piston 99 therein, thereby elevating the frame 71 to release it from clamped engagement with the base 70. With the housing 71 in elevated unclamped position the switch 86 is released and will thereupon operate to effect the energization of a solenoid 531 which is associated with a control valve 532 that is operable to control the rotation of the housing 71. With the solenoid 531 energized, the valve 532 operates to direct pressure fluid from a branch supply line 533 into the upper end 82 of the cylinder 77 via the connecting line 79. With the pressure fluid supplied to the upper end 82 of the cylinder 77 the piston 76 of the actuator 80 is moved downwardly to effect the rotation of the housing 71 thereby moving the tool operator 63 from the "bore" position to the "turn" position. With the tool operator 63 positioned in the "turn" position, the dog 85 will be positioned to actuate the switch 83, as depicted in FIG. 14. The switch 83 upon being actuated will effect the de-energization of the solenoid 526 and also of the solenoid 531. With the solenoid 531 de-energized, the valve 532 is returned to its centered position, depicted in FIG. 14, wherein it operates to block the flow of fluid therethrough. However, with the solenoid 526 de-energized, its associated valve 527 will be returned to its normal position wherein it operates to direct the pressure fluid from the line 528 into the line 105 which is connected to the upper end of the cylinder 98. With this condition obtained, the pressure fluid will act on the piston 99 to effect its downward movement moving the frame 71 into clamped engagement with the base 70. Thereupon the switch 86 will again be actuated to provide a signal to indicate that the tool operator is in the clamped position. At this time the tool operator 63 has been rotated from the "bore" position to the "turn" position and is clamped therein.

The tool operator 63 can be returned from the "turn" position to the "bore' position at any time by the operator. To this end the operator will depress a push button switch 535 included on the control console 490 of FIG. 1. With the switch button 535 depressed, the solenoid 526 associated with the control valve 527 will be energized so that the valve is operable to direct pressure fluid to the lower end of the cylinder 98 thereby elevating the frame 71 to an unclamped position as previously described. With the frame 71 in an elevated unclamped position, the switch 86 will be released. At this time the circuit established through the push button switch 535 is maintained and when the switch 86 is released, it will operate to effect the energization of a solenoid 536 associated with the control valve 532. With the solenoid energized, the valve 532 will operate to direct pressure fluid into the line 78 so that the piston 76 of the actuator 80 is moved upwardly to thereby effect the rotation of the frame 71 in a clockwise direction to move it from the "turn" position to the "bore" position. With the frame 71 rotated 90° wherein the tool operator 63 is in the "bore" position, the dog 85 moving with the frame will be in position to actuate the switch 84. With the switch 84 actuated it will operate to effect a de-energization of the solenoid 526 associated with the valve 527 so that the valve is returned to its normal position wherein it operates to direct the pressure fluid into the line 105 and thence into the upper end of the cylinder 98 to effect the movement of the frame 71 into clamping engagement with the base 70. Since the housing 71 has now been rotated 90° and is in the "bore" position, the dog 88 will be positioned above the switch 86 and when the housing 71 is moved into clamping engagement on the base 70, the dog 88 will engage and actuate the switch 86 to thereby obtain a signal to indicate that the tool operator is in a clamped position. When the switch 84 was actuated it also operated to effect the de-energization of the solenoid 536 associated with the control valve 532 so that the valve is returned to its centered position wherein it operates to block fluid flow therethrough.

The movements of the tool operator slide 62 and the headstock 31 are normally accomplished automatically under the control of signals obtained from a record such as the tape 539 which is read by a tape reader 540. The automatic operation of the tool slide 62 and the headstock 31 is coordinated automatically from the signals obtained from the record so that a desired work operation will be performed on a workpiece carried by the headstock 31. However, movement of the tool operator slide 62 and the headstock 31 may also be initiated by the operator. Irrespective of the mode of operation the operator will first rotate a switch 538 to an "on" position. With the switch 538 in "on" position it will operate to energize a solenoid 542 associated with the valve 543 that is operative to control the flow of pressure fluid to the servo operated valves 545 and 547 respectively associated with the motors 37 and 140. With the solenoid 542 energized, the valve 543 is operated to direct pressure fluid from the main relatively high pressure supply line 483 to a line 544 which is connected to a servo operated valve 545. The pressure fluid directed into the line 544 will also flow into a connecting line 546 and thence to another servo valve 547 which is operative to control the direction and rate of movement of the slide 62. With the valve 543 operated, as described, return lines 548 and 549 are connected through the valve 543 to a main return line 550. However, when the solenoid 542 is de-energized and the valve 543 is returned to its normal position, the lines 544, 549 and 548 are all, by operation of the valve, connected to the return line 550.

For effecting the selective movement of the tool operator slide 62, either upwardly or downwardly as desired, a directional selector switch 551 located on the console 490 is manually positioned into either an up U position or a down D position, depending upon whether it is desired to have the slide 62 move upwardly or downwardly. The setting of the selector switch 551 into one or the other of its two control positions will serve to operate the servo valve 547 to effect the desired direction of operation of the motor 140 for moving the slide 62 in the selected direction.

With the selector switch 551 in a selected position, the operator will actuate a push button switch 552. With the push botton 552 depressed it will operate to effect the actuation of servo valve 547 wherein the motor 140 will be caused to rotate in a selected direction depending upon the position of the directional selector switch 551 to effect the movement of the slide 62. The movement of the slide 62 in the selected direction will continue as long as the switch 552 is maintained depressed. When the slide 62 has reached a desired position, the operator will release the push button switch 552 to thereby interrupt the operation of the servo valve so that the motor 140 is no longer operated.

A similar arrangement is provided for the headstock 31 wherein there is provided a directional selector switch 553 and a push button motion initiating switch 554. With the selector switch 553 positioned in a rightward R selecting position the operator may depress the push button switch 554 thereby effecting the operation of the servo valve 545 for effecting the operation of the motor 37 to accomplish rightward movement of the headstock 31.

The rightward movement of the headstock 31 will continue as long as the operator maintains the push button switch 554 depressed. When it is desired to stop the movement of the headstock 31 the operator merely releases the push button switch 554 to stop the operation of the motor 37. Should the operator desire to move the headstock 31 leftwardly he will position the selector switch 553 into a leftward movement selecting position L and thereafter depress the push botton switch 554 which thereupon effects the operation of the servo valve 545 for effecting the operation of the motor 37 in a direction to move the headstock 31 leftwardly. When a desired amount of leftward travel has been accomplished, the operator will release the push button switch 554 to stop the operation of the motor 37.

The supply of pressure fluid to the headstock spindle speed transmission 42, the various clutch mechanisms and actuator for operating the clamp elements 279 are under the general control of a valve 557. When the machine is turned on, a selector switch 555 will be moved to "on" position thereby effecting the energization of a solenoid 556 associated with the valve 557. The valve 557 is made operable to connect the branch pressure fluid supply line 558 to a line 559 anl the pressure is then available to effect the operation of the various mechanisms as required.

The operation of the directional clutches 49 and 50 as well as the drive or run clutch 51 that are associated with the headstock spindle 41 may be effected either automatically from signals obtained from the tape 539 or can be effected manually by the operator.

Assuming now that it is desired to effect the operation of the headstock spindle 41 in a manual mode, the operator will depress a push button switch 560 which operates to effect the energization of a solenoid 561 associated with the drive clutch control valve 562. With the solenoid 561 associated with the valve 562 energizes, the pressure fluid flowing into the line 559 will flow through a creep clutch control valve 565 and into a connected line 566 and thence into a connecting line 567. The fluid pressure in the line 567 will flow through the valve 562 and into a line 569 which is connected to the actuating mechanism of the drive clutch 48 to thereby engage the clutch and connect the output shaft of the motor 47 to the power transmitting shaft 568. The push button switch 560 when depressed will also operate to effect the energization of a solenoid 572 associated with a clutch control valve 573. With the solenond 572 energized the valve 573 is operated to direct fluid pressure from the pressure supply line 566 into a connected line 574 which has its opposite end connected to the actuating mechanism of the clockwise directional clutch 50. On the other hand, a switch 570 located on the control console 490 will be depressed by the operator should it be desired that the spindle be rotated in a counterclockwise direction. With the push button switch 570 depressed it will operate to effect the simultaneous energization of the solenoid 561 associated with the drive clutch control valve 562 and of a solenoid 577 associated with the valve 573 to operate the valve for directing pressure fluid from the pressure fluid supply line 566 into a line 578 which is connected to the operating mechanism of the counterclockwise clutch 49. Simultaneously therewith, the valve 573 operates to connect the line 574 to the return line 579 so that the clockwise clutch 50 is de-energized or deactuated. Thus, the counterclockwise clutch 49 will be retained operative while the clockwise clutch 50 will be deactuated and the power input from the motor 47 will be connected via the drive clutch 48 and the counterclockwise clutch 49 to the transmission 42.

As previously mentioned, the headstock spindle 41 is stopped in a predetermnied angularly oriented position and can be accomplished with the spindle 41 connected for rotation in either a clockwise or counterclockwise direction. The operator may effect such stoppage of the spindle by depressing a switch button 585 located on the console 490. With the switch 585 depressed, it will effect the de-energization of the solenoid 561 that is associated with the drive clutch control valve 562. The valve will return to its normal position, as depicted in FIG. 13, wherein it operates to connect the operating mechanism of the drive clutch 48 to the hydraulic return line 576. Simultaneously therewith, the depressed switch 585 will also operate to effect the energization of a solenoid 586 associated with the creep control valve 565. With the solenoid 586 energized the valve 565 is operated to direct the pressure fluid from the supply line 559 into a connected line 587. The fluid pressure supplied to the cylinder 67 via the line 587 will flow into the cylinder and by means of suitable passages in the piston 66 the pressure fluid will flow therethrough into a connected line 588 which has its opposite end connected to its actuating mechanism of the creep clutch 51. With pressure fluid supplied to the actuating mechanism, the creep clutch 51 will be engaged so that it operates to connect the output shaft of the motor 47 to the transmission 42 for effecting the rotation of the headstock spindle 41 at a creep speed. Simultaneously, with the pressure fluid being supplied to the creep clutch 51, pressure fluid is also supplied to the lower end of the cylinder 67 via a connecting line 68. Thus, as the spindle 41 is driven at a creep speed, the plunger 53 is urged into engagement with the periphery of the plate 55 which rotates with the spindle as previously described. The plunger 53 is forcefully engaged with the periphery of the plate 55 and when the notch 54 is aligned with the plunger 53, the plunger will enter into registration with the notch to stop the rotation of the spindle 41 and locate it in the desired predetermined angularly oriented position. As the plunger 53 moves into registry with the notch 54, the piston 66 will move upwardly to interrupt the flow of pressure fluid between the lines 587 and 588 thereby effecting deactuation of the creep clutch 51 to interrupt the drive between the motor 47 and the transmission 42. With the shot pin 53 engaged in the notch 54 of the locating plate 55 the actuating arm of the switch 69 will be released and the switch 69 will operate to provide a signal to indicate that the headstock spindle is in a predetermined angularly orientated position. The shot pin 53 is maintained in engagement with the notch 54 until such time as the drive clutch 48 is activated either automatically from a signal obtained from the tape 539 or by the actuation of one or the other of the push button switches 560 or 570. In either event, when the drive clutch 48 is activated the solenoid 586 associated with the valve 565 is de-energized so that the valve returns to its normal position wherein it again connects the pressure fluid supply line 559 with the line 566 and also connects the line 587 to the tank line 576. When this condition is obtained the spring 75 will react on the piston 66 moving it downwardly to effect the withdrawal of the shot pin 53 from the locating plate 55, as previously described. With the shot pin 53 in disengaged position the actuating arm of the switch 69 will be moved downwardly to operate the switch to produce a signal for indicating that the spindle 41 is released.

With the headstock spindle 41 stopped in the desired predetermined angularly orientated position, the solenoid 572 or 577 will be de-energized depending upon which of the two had been previously energized. Thus, both of the solenoids 572 and 577 will be de-energized and the valve 573 will return to its normal position wherein it operates to connect both of the directional clutches 49 and 50 to the pressure fluid. Thus, both directional clutches will be energized and they cooperate to act as a brake to prevent rotation of the spindle 41.

Assuming now that it is desired to change workpieces wherein a new workpiece on the set up device 305 located in the change station will be placed in the headstock spindle 41 while the finished workpiece from the headstock spindle will be placed on the set up device. This operation may be accomplished automatically from signals obtained from the tape 539 or may be manually initiated by the machine operator. In manual mode the operator will initiate a workpiece change cycle of operation by depressing a push button switch 590 located on the control panel of the console 490. It will be assumed for the purpose of this description that certain initial conditions prior to effecting the workpiece change have been obtained. These initial conditions are that the set up device 305 is in a horizontal position and the associated switch 467 is actuated; the set up device quill 391 is in an advanced position to present the new workpiece in the change station thereby actuating the switch 450 in a counterclockwise direction; the headstock 31 is in its retracted "home" position wherein the switch 491 is actuated and finally the grips 308 and 309 must be in a released condition so that the switch 341 is actuated. It is also assumed that the headstock spindle 41 is stopped and located in a predetermined desired angularly orientated position and that the switch 69, depicted in FIG. 13, is released. To effect the rotation of the workpiece change arm 306 from a vertical "parked" position to a horizontal workpiece engaging position, the workpiece change arm shot pin locating mechanism 471 must be actuated to effect the retraction of the shot pin 476 out of engagement with the locating notch or opening 477 provided in the hub of the workpiece change arm 306. This will be accomplished when the operator depresses the push button switch 590 to thereby effect the energization of a solenoid 592 associated with the control valve 593 as schematically depicted in FIG. 14. With the solenoid 592 energized, the valve 593 will operate to direct pressure fluid from the supply line 488 into a line 594 which is connected to the right end of the cylinder 472. The pressure fluid supplied to the right end of the cylinder 472 will effect the retraction of the shot pin 476 out of engagement with the locating notch associated with the workpiece change arm 306, to release the arm. Exhaust fluid from the left end of the cylinder 472 will flow into a connected line 595 and by operation of the valve 593 will be directed into a return line 596 which, in turn, is connected to the main return line 520 that is in communication with the auxiliary reservoir 482. With the shot pin 476 in retracted position the switch 459 will be operated to effect the energization of a solenoid 601 that is associated with the control valve 602, shown in FIG. 14. The valve 602 is normally operable to connect a pair of motor lines 603 and 604 to an auxiliary reservoir 482A via a return line 605. However, with the solenoid 601 energized the valve is operated to direct pressure fluid from a supply line 546 into the line 604 so that pressure fluid is supplied to the motor 347 to effect its operation for driving the tool change arm in a counterclockwise direction, as viewed in FIG. 2, or from the right, as viewed in FIG. 14. The exhaust fluid from the motor 347 will flow into the line 603 and by operation of the valve 602 will be directed into the line 605 to return to the auxiliary reservoir 482A. As the arm 306 is rotated from the vertical "parked" position the dog 359 will be moved out of engagement with the actuating arm of the switch 355 to release the switch. The release or deactuation of the switch 355 has no effect but is conditioned for subsequent operation. As the arm 306 approaches the horizontal position the dog 362, shown diagrammatically in FIG. 14, and in broken lines in FIG. 10, will be moved into position to engage with the actuating arm of the switch 356 to move the arm in a clockwise direction, as viewed in FIG. 14, to actuate the switch 356. The switch 356 upon being actuated in a clockwise direction by the dog 362 will operate to effect the de-energization of the solenoid 592 associated with the valve 593 so that the valve is returned to its normal position whereby it directs fluid pressure into the line 595 while connecting the line 594 to the return line 596. The pressure fluid supplied via the line 595 to the cylinder 472 will operate to effect the rightward movement of the shot pin 476 rightwardly, as viewed in FIG. 14, or upwardly, as viewed in FIG. 10, thereby engaging the shot pin with the periphery of the tool change arm 306. Thus, when the arm 306 reaches the horizontal position wherein the grip 308 engages with the fixture ring 275A presented by the set up device 305 and the grip 309 engages with the fixture ring 275 presented by the spindle 41 of the headstock 31 the locating shot pin 476 will be moved into the locating opening 478, shown in FIG. 10, and will stop the arm in a horizontal position. With the shot pin 476 in engagement within the locating opening 478 in the hub of the workpiece change arm 306 the switch 459 will be released. Upon the release of the switch 459 the solenoid 601 associated with the valve 602 is de-energized so the valve is returned to its normal position and operates to connect the motor lines 603 and 604 to the reservoir 482A, as previously described. With the switch 356 actuated in a clockwise direction by the dog 362 and also the switch 459 released, a solenoid 609 associated with a control valve 610 will be energized. The valve 610 will operate to direct the pressure fluid obtained from the line 488 into a connected line 611 which has its opposite end connected to the lower end of the cylinder 336, as viewed in FIG. 14. The valve 610 also operates to connect the line 612 to the return line 596. Thus, the pressure fluid flowing in the line 611 will be directed into the lower end of the cylinder 336, as viewed in FIG. 14, or the upper end of the cylinder 336, as viewed in FIG. 11. The pressure fluid directed into the lower end of the cylinder 336, as viewed in FIG. 14, will force the upward movement of the piston 337 thereby operating the crank mechanism 328 for moving the wedge blocks 322 and 323 into wedge camming engagement with the locking plungers 312 and 313 associated with the grips 308 and 309 respectively. Thus, the fixture rings 275A and 275 are secured with the grips 308 and 309 respectively, and switch 341 is released.

With the switch 341 released the solenoid 614 associated with the control valve 615 will be energized so that the valve operates to direct pressure fluid from the supply line 489 into the line 366 which is connected to the rod or right end of the cylinder 296, as viewed in FIG. 13. The valve 615 also operates to connect the line 364 to a return line 576 so that exhaust fluid from the left end of the cylinder 296 will be returned to the reservoir 482. The pressure fluid directed to the rod end of the cylinder 296 will effect the leftward movement of the piston 298 therein to thereby retract the actuating rod 293 to release the clamped elements 279 associated with the spindle head 268 of the headstock 31. Simultaneously, with the operation of the actuator 295 to effect a release of the headstock spindle head clamp elements 279 the clamp elements 406 associated with the set up device spindle head 393 are also released. To this end, the released switch 341 also operates to effect the energization of the solenoid 619 associated with the control valve 620 thereby operating the valve to direct pressure fluid from the main supply line 488 into the connecting line 431 which is connected to the rightward or rod end of the cylinder in which the piston 421 is reciprocally supported. The valve 620 also operates to connect the lines 428 to the return line 596 so that exhaust fluid from the left end or head side of the cylinder is returned to the reservoir 482. The pressure fluid supplied to the rod end of the bore 422 will effect leftward movement of the piston 421 thereby retracting the actuating rod 418 leftwardly so as to release the clamp elements 406 associated with the headstock spindle head 393 to release the fixture ring 275A. With the clamp elements 279 that are associated with the spindle head 268 of the headstock 31 released, the switch 303 will be actuated; and, with the clamp elements 406 associated with the set up device spindle head 393 released, the switch 434 will also be actuated.

Actuation of both of the switches 303 and 434 will operate to effect the movement of the headstock spindle 31 leftwardly to a full retracted position, leftwardly of the "home" position, whereby a separation is effected between the headstock spindle head 268 and the fixture ring 275, as shown in FIG. 12. To this end, the servo valve 545, as shown in FIG. 13, will be operated to effect the operation of the motor 37 in a direction to retract the headstock 31 moving it in a leftward direction. With the headstock 31 moved leftwardly its full limit of travel, the dog 492, as shown in FIGS. 1 and 13, will be positioned to engage the operating plunger of the switch 621 and thereby actuate the switch to interrupt the operation of the motor 37 and stop the headstock leftward movement.

The actuated switches 303 and 434 also operate to effect the energization of a solenoid 624 associated with a control valve 625. Thereupon the valve 625 is operable to direct pressure fluid obtained from the supply line 488 into a line 446 which is connected to the right end of the cylinder 441 to supply the pressure fluid to the head side of the piston 443 therein. Simultaneously, the leftward end of the cylinder 441 which is connected to the valve 625 via the line 447 will be connected to the return line 596. Thus, the pressure fluid supplied to the right end of the cylinder 441 will serve to move the piston 443 leftwardly for effecting the retracting of the quill 391. The leftward movement of the quill 391 to a full retracted position will effect the separation between the set up device spindle head 393 and the fixture ring 275A, thereby leaving the fixture ring 275A and the workpiece secured to it in the grip 308 of the change arm 306. With the quill 391 in full retracted position the switch 450 will be actuated in a clockwise direction. The actuation of both of the switches 450 and 621 will operate to effect the energization of the solenoid 592 associated with the valve 593 and the valve will operate to direct pressure fluid to the right end of the cylinder 472. The pressure fluid supplied to the right end of the cylinder 472 will serve to effect the retraction of the locating pin 476 so as to release the arm 306. With the locating pin 476 fully retracted, the switch 459 will be actuated and will operate to effect the energization of the solenoid 601 associated with the motor control valve 602. The valve 602 will again be operated to direct pressure fluid to the motor 347 for effecting its operation for rotating the workpiece change arm 306 180° in a counterclockwise direction. The 180° of angular movement imparted to the arm 306 will serve to effect an interchange in the location of the grips 308 and 309. Thus, the grip 308 with the fixture ring 275A carrying the new workpiece will be moved into position to align the axis of the fixture ring 275A with the axis of the headstock spindle 41. On the other hand, the grip 309, with the fixture ring 275 on which the previously operated upon workpiece W is secured, will be rotated to position the fixture ring 275 in axial alignment with the set up spindle 391. As the arm 306 is rotated in its 180° of interchange movement the dog 362 moving with the arm drive shaft 342 will be moved out of engagement with the operating arm of the switch 356 to thereby release the switch.

As the workpiece change arm 306 approaches the 180° workpiece interchange position the dog 363 will engage and actuate the switch 356 in a clockwise direction. With the switch 356 actuated clockwise, it will operate to effect the de-energization of the solenoid 592 associated with the valve 593 so that the valve is operated to its normal position whereby it directs pressure fluid into the line 595 that is connected to the left end of the cylinder 472. The pressure fluid supplied to the left end of the cylinder 472 will effect rightward movement of the locating rod 476 and it will engage the periphery of the hub of the arm 306. Thus, when the arm 306 arrives at the horizontal workpiece interchange position the locating pin 476 will be biased into engagement with a locating opening (not shown) formed in the hub of the arm diametrically opposite from the opening 478, depicted in FIG. 10. Upon the locating engagement of the pin 476 the switch 459 will be released. With the workpiece change arm 306 in a horizontal workpiece interchange position the dog 363 on the shaft 342 will be positioned to actuate the switch 356 in the clockwise direction, as viewed in FIG. 14. With these conditions obtained the servo valve 545 which is operatively connected to effect the movement of the headstock 31 will be operated to advance the headstock 31 from a fully retracted position rightwardly to the "home" position to engage the headstock spindle head 268 with the fixture ring 275A which is held in axial alignment therewith by the workpiece change arm 306. With the headstock 31 in the "home" position the switch 491 will be actuated by the dog 492 and the switch will operate to interrupt the operation of the servo valve 545 thereby stopping the headstock 31 in the "home" position.

The released switch 459 and the actuated switch 356 also operate to effect the de-energization of the solenoid 624 associated with the control valve 625. The valve 625 will thereupon be returned to its normal position, as depicted in FIG. 14, wherein it operates to direct the pressure fluid into the line 447 which is connected to the rod end of the cylinder 441. The pressure fluid to the rod end of the cylinder 441 will serve to effect rightward movement of the piston 443 thereby advancing the quill 391 of the set up device 305 rightwardly to engage the spindle head 393 with the fixture ring 275 that is presented in axial alignment by the grip 309 of the arm 306. With the quill 391 in full advanced position the switch 450 will be actuated in a counterclockwise direction. The actuated switches 450 and 491 will effect the de-energization of the solenoid 614 associated with the control valve 615 and also the deenergization of the solenoid 619 associated with the control valve 620. With the solenoid 614 de-energized the valve 615 will be returned to its normal position, depicted in FIG. 13, and will operate to direct pressure fluid to the left end of the cylinder 296 thereby effecting rightward movement of the piston rod 298 to advance the actuating rod 293 into engagement with the clamp elements 279 associated with the headstock spindle 41. With the actuating rod 293 urged rightwardly the clamp element 279 will be pivoted into clamping engagement to clamp the fixture ring 275A to the headstock spindle head 268. In like manner, with the solenoid 619 associated with the control valve 620 de-energized, the valve will be returned to its normal position, shown in FIG. 14, wherein it operates to direct pressure fluid into the line 428 which is connected to the left end of the cylinder in which the piston rod 421 is supported. The pressure fluid supplied via the line 428 will effect the rightward movement of the piston rod 420 moving the actuating rod 418 rightwardly to effect the pivotal movement of the clamp element 406 into clamping engagement with the fixture ring 275 so that the fixture ring is securely clamped to the set up device spindle head 393.

With the headstock spindle head clamped, the switch 303 will be released and with the set up device spindle head 393 clamped, the switch 434 will also be released. With both of the switches 303 and 434 released, the solenoid 609 associated with the valve 610 will be de-energized so that the valve is returned to its normal position where it operates to direct the pressure fluid into the connected line 612, as depicted in FIG. 14. Pressure fluid in line 612 will flow into the cylinder 366 at the head side of the piston 337 to operate the piston for moving the crank arm 328 in a clockwise direction, as viewed in FIG. 11, thereby effecting a release of the plungers 312 and 313 associated with the grips 308 and 309, respectively. With the locking plungers 312 and 313 released, the switch 341 will be actuated. Thereupon the solenoid 592 associated with the control valve 593 will again be energized to operate the valve so that it directs pressure fluid to the right end of the cylinder 472 to effect the retraction of the location plunger 476 out of engagement with the workpiece change arm 306. Upon the retraction of the locating plunger 476 the switch 459 will be actuated and will effect the energization of the solenoid 627 associated with the control valve 602. With the solenoid 627 energized the valve 602 is operative to direct pressure fluid from the line 546 into the line 603 so that pressure fluid is supplied to the motor 347 to effect its operation in a direction to rotate the workpiece change arm 306 in a clockwise direction, as viewed in FIG. 2, to disengage the grips 308 and 309 from the fixture rings and return the arm to a vertical "parked" position. As the arm 306 is rotated in a clockwise direction and approaches the vertical "parked" position the dog 361 will engage the actuating arm of the switch 355 to operate it in a clockwise direction, as viewed from the right in FIG. 14, thereby actuating the switch. With the switch 355 actuated in a clockwise direction, it will operate to effect the de-energization of the solenoid 592 associated with the control valve 593. The valve 593 will be returned to its normal position, depicted in FIG. 14, where it operates to direct pressure fluid from the line 488 into the connected line 595 which is in communication with the left end of the cylinder 472. The pressure fluid supplied to the left end of the cylinder 472 will move the locating rod 476 into engagement with the periphery of the hub of the workpiece change arm 306 so that it rides thereupon. Under this condition when the arm 306 is moved into the vertical "parked" position the locating plunger 476 will immediately move into registry with a locating recess in the hub of the arm 306 to lock the arm in the vertical "parked" position. As the plunger 476 moves into registration with the recess in the arm 306 the switch 459 will be released and the switch will operate to effect the de-energization of the solenoid 627 associated with the control valve 602. The valve 602 will then operate to return to its centered position where it operates to connect both of the motor lines 603 and 604 to the reservoir 482A.

With the workpiece change arm 306 returned to a vertical "parked" position a workpiece interchange operation has been completed and a new workpiece has been clamped to the headstock spindle head 268 where it may be advanced to the tool operator for having a work operation performed thereon. At this time the rip 309 of the arm 306 will be in the uppermost position while the grip 308 is in the lowermost position. Thus, in the next cycle of operation the grip 309 will be rotated to engage the fixture ring presented by the set up device 305 while the grip 308 will be moved into engagement with the fixture ring presented by the headstock spindle 41.

With the workpiece change arm 306 in the vertical "parked" position the set up device 305 may be returned to the vertical "load" position where the workpiece may be removed and a different workpiece placed thereon for subsequent transfer to the headstock spindle. To return the set up device 305 to the "load" position the operator must first effect the retraction of the quill 391. To effect such retraction of the quill 391 the operator will depress a push button switch 630 that is located on the control console 490, as shown in FIG. 15. With the push button switch 630 depressed it will operate to effect the energization of the solenoid 624 associated with the control valve 625 and the valve operates to direct pressure fluid into the line 446 that is connected to the right end of the cylinder 441. The pressure fluid supplied to the right end of the cylinder 441 will effect leftward movement of the piston 443 to effect the retraction of the quill 391 to the position depicted in FIG. 12. With the quill 391 in retracted position, the switch 450 will be actuated clockwise and a solenoid 634 associated with the control valve 635 will be energized. The valve 635 will operate to direct pressure fluid into the connected line 636 and it will flow through a check valve 637, and thence into the upper end of the cylinder 371A. Simultaneously therewith, the valve 635 operates to connect a line 638 which is in communication with the lower end of the cylinder 371A to the return line 520. With pressure fluid supplied to the upper end of the cylinder 371A via the line 642 the piston 376A will move downwardly thereby effecting the bodily movement of the set up device 305 from the horizontal position to a vertical position. As the set up device moves from the horizontal to the vertical position, exhaust fluid from the lower end of the cylinder 371A will flow into the line 638 and will flow through a flow control valve 639 thereby by-passing the check valve 641. The flow control valve 639 is set to regulate the rate at which the set up device will be pivoted from the horizontal to the vertical "load" position.

When the set up device is in the vertical "load" position the switch 468 will be actuated and the solenoid 619 associated with the control valve 620 will be energized. The valve will operate to direct pressure fluid to the rod side of the piston 421 to effect the leftward movement of the piston thereby retracting the actuating rod 418 to release the clamp elements 406. With the clamp elements 406 released, the switch 434 will again be actuated but its operation has no effect at this time. Thus, the fixture ring 275 with the finished workpiece W is released and may be removed as a unit from the set up device 305 by any suitable means (not shown).

A new fixture ring with another workpiece may be mounted on the set up device and after properly orientating the fixture ring with the workpiece thereon with respect to the spindle head 393, the fixture ring may be clamped to the spindle head 393 for subsequent movement into the horizontal workpiece change position. To operate the clamp elements 406 into clamping engagement with the fixture ring mounted on the head 393, the operator will depress a push button switch 645 which is located on the control console 490. With the switch 645 actuated, the solenoid 619 associated with the control valve 620 will be de-energized and the valve will operate to direct the pressure fluid into the line 428. Pressure fluid supplied to the line 428 will be directed to the head side of the piston 421 and will move the piston rightwardly thereby advancing the actuating rod 418 to effect the radial outward pivotal movement of the clamp element 406 into clamping engagement with the fixture ring on the set up device head 393. With the clamp elements 406 in clamped engagement with the fixture ring, the switch 434 will be released, but its release has no control effect at this time.

As previously mentioned, the set up device spindle head 393 may be rotated so as to orientate an indicating mark 454 that is provided on the periphery of the head 393 to align it with an indicating mark 455 that is provided on the frame 382. The angular orientation of the spindle head 393 with respect to the frame 382 will serve to angularly position the set up device spindle head 393 in predetermined angular relationship with respect to the angular position of the headstock spindle head 268. With this condition obtained, the subsequent transfer of a fixture ring, such as the ring 275A, from the set up device 305 to the headstock 31, will serve to locate the workpiece carried by the fixture ring in a predetermined angularly orientated position with respect to the headstock spindle head 268. Also, the clutch teeth 401 of the fixture ring that is transferred will be in a proper angularly orientated position with respect to the clutch teeth 272 of the ring 271 associated with the headstock spindle head 268. Thus, upon the advancement of the headstock 31 to engage the spindle head 268 with a fixture ring presented by the workpiece change arm 306, a proper meshing engagement will be effected between the clutch teeth of the ring 271 associated with the head 268 and the clutch teeth associated with the ring of the fixture head. To effect the angular rotation of the set up device spindle head 393 with respect to the frame 382 the spindle 392 must be released so that it may be rotated in the quill 391. To this end the operator will actuate a selector switch 646 to an unlocked UNL position and the switch when so positioned will operate to effect the energization of the solenoid 649 associated with a control valve 650, shown in FIG. 14. With the solenoid 649 energized, the valve 650 will operate to direct pressure fluid into the line 466 so that pressure fluid is supplied to the rod end of the cylinder 461 to effect the leftward movement of the piston 462. The leftward movement of the piston 462 will operate to effect the retraction of the shot pin 457, shown in FIG. 12, from the locating notch 456 provided in the set up device spindle 392, as previously described. With the shot pin 457 in retracted position the spindle head 393 supported in the bearings 394 and 395 may be rotated manually to align the indicating mark 454 on the periphery of the head with the indicating mark 455 provided on the periphery of the frame member 382. Since the workpiece was previously secured to the new fixture ring in a desired orientated position and the fixture ring itself angularly orientated with respect to the set up spindle head 393, the subsequent orientation of the set up device spindle head 393 with respect to the mark 455 on the body portion 382 of the set up device will, of course, angularly orientate the new workpiece with respect to the mark 455. Thus, as previously mentioned, on the subsequent transfer of the fixture ring with the new workpiece thereon to the headstock 31 both the fixture ring and the workpiece thereon will be positioned in a desired angularly orientated position with respect to the headstock spindle head 268.

To lock the set up device spindle head 393 in the predetermined angularly orientated position with respect to the mark 455, the operator will move the selector switch 646 from the unlocked UNL position to a locked L position thereby effecting the de-energization of the solenoid 649 associated with the control valve 650. The valve 650 will thereupon return to its normal position wherein it operates to direct pressure fluid into the line 464 that is connected to the left end of the cylinder 461. As a result, the piston 462 will be moved rightwardly within the cylinder thereby effecting the engagement of the shot pin 457 in the angularly orientated notch 456. With the shot pin 457 in registry with the locating notch 456, shown in FIG. 12, the spindle 392 will be locked in a predetermined angularly orientated position and, as a result, the head 393 is also angularly orientated.

With a new fixture ring and a new workpiece secured to the set up device spindle head 393, the set up device 305 may be pivoted from the vertical "load" position to a horizontal workpiece presenting position. To this end the operator will depress a push button switch 651 which will operate to effect the de-energization of the solenoid 634 associated with the control valve 635. The valve will return to its normal position, as depicted in FIG. 14, wherein it operates to direct pressure fluid into the line 638 so that pressure fluid will flow through the check valve 641 into the lower end of the cylinder 371A. The pressure fluid to the lower end of the cylinder 371A will serve to move the piston 376A upwardly and thereby effect the pivotal movement of the set up device 305 from the vertical "load" position to the horizontal position. Exhaust fluid from the upper end of the cylinder 371A will flow out of the cylinder into the connected line 636 and will by-pass the check valve 637 by flowing through the flow control valve 642 which is set to regulate the rate of pivotal movement of the set up device as it is moved from the vertical "load" position to the horizontal position. The exhaust fluid flowing to the flow control valve 642 will be returned to the reservoir by operation of the valve which serves to connect the line 636 to the return line 520. With the set up device frame 368 in a horizontal position the switch 467 will be actuated. The operator will now depress a push button switch 652 to effect the de-energization of the solenoid 624 associated with the control valve 625. The valve will then return to its normal position, depicted in FIG. 14, and will operate to direct pressure fluid into the line 447 which is connected to the left end of the cylinder 441. The pressure fluid supplied to the left end of the cylinder 441 will effect rightward movement of the piston 443 within the cylinder 441 which, in turn, will effect the rightward movement of the quill 391 for advancing the head 393 from the position it occupies, as depicted in FIG. 12, rightwardly to position the fixture ring with the new workpiece thereon in the workpiece change station wherein the ring will be located in the path of travel of the arm 306. With the quill 391 in full advanced position the switch 450 will be actuated in a counterclockwise direction to indicate that a workpiece is in the workpiece change station.

As previously mentioned, the rotation of the tool storage magazine 145 in a tool selecting operation is normally effected automatically from signals obtained from the record such as the tape 539 passing over the tape reader 540 which is contained in the console 490. However, the operator may manually initiate rotation of the tool storage magazine 145 for selectively positioning the magazine for locating any one of the tools contained in the magazine at the ready station 148. It will be recalled that the motor 235 is maintained energized for operation in one direction whereby it drives the magazine 145 in a direction to engage an abutment 259, shown in FIG. 8, in engagement with a retractable positive stop 258. To offset such energization of the motor 235 a control valve 660 is normally operable to direct pressure fluid obtained from a pressure fluid supply line 661 into a connected line 662. The pressure fluid directed to the line 662 will flow through the check valve 663 and into the motor 235 to effect its operation for rotating the magazine 145 in a direction to engage a locating dog 259 with the retractable stop 258. At this time exhaust fluid from the motor will flow through the flow regulating valve 664 set to establish the rate of rotation of the magazine in the reverse direction and flow into a connecting line 666 which is connected to a port of the valve 660. Thus, the exhaust fluid flowing to the valve 660 will, by operation of the valve, be directed into a return line 520 to return to the reservoir 482, as previously described. To effect the rotation of the magazine 145 in a tool selecting operation the operator will depress a push button 655 which is located on the console 490. Actuation of the switch button 655 will serve to effect the energization of the solenoid 659 associated with the valve 660 whereupon the valve operates to direct fluid pressure from the supply line 661 into the line 666. The pressure fluid into the line 666 will flow through the check valve 667 and will flow through the valve and into the motor 235 to effect its operation in a direction to move the tools in the magazine through the ready station 148 past the reader 245. The rotation of the magazine 145 will continue as long as the operator maintains the push button 655 depressed. When a desired tool arrives at the ready station 148 the operator will merely release the push button and it will thereupon operate to effect the de-energization of the solenoid 659 so that the value 660 is returned to its normal position wherein it directs pressure fluid into the line 662 and thence the motor 235 for reversing the rotation of the motor for locating the selected tool at the ready station 148 as previously described.

If the operator so desires, he may at any time override the automatic control and effect the movement headstock 31 to its "home" position. This he would do when he desires to effect a tool change or a workpiece change in manual mode. To effect a return of the headstock 31 to the "home" position a push button switch 670 will be depressed. As a result, the servo valve 545 will operate to direct pressure fluid to the motor 37 so as to effect its operation in a direction to move the headstock 31 leftwardly. When the headstock 31 is in the "home" position the switch 491 will be actuated and the operation of the servo valve 545 will be interrupted thereby stopping leftward movement of the headstock 31.

A complete cycle of operation has now been described and a new workpiece is located in position to be interchanged with the finished workpiece presently being worked on by the tool operator 63. It is apparent therefore that a minimum downtime is experienced and that a previously finished workpiece may be removed and a new workpiece located in the set up device 305 and presented in a change station for subsequent transfer to the headstock spindle 31 while the tool operator 63 is working on the workpiece that is being rotated by the headstock spindle. It should be also noted that the tool operator 63 may have its tool changed at any time according to the work operation to be performed and such tool changing is effected automatically in a minimum amount of time or may be manually effected by the operator as desired.

The principles of this invention having now been fully explained in connection with the foregoing description, we hereby claim as our ivention:

1. In a machine tool having a frame:
a tool operator carried by said frame;
a rotary work spindle for supporting workpieces in a work position relative to said tool operator;
an adaptor for carrying individual workpieces;
workpiece set-up means spaced from said work spindle to receive said adaptor and the workpiece secured thereon;
orientating means in said set-up means for angularly orientating the adaptor located therein and its associated workpiece in a predetermined angular position;
means connected to stop the rotation of said work spindle in a predetermined angular position upon discontinuation of its rotation; and,
transfer means actuatable to transfer said adaptor and the workpiece carried thereon from said set-up means to said spindle so that the workpiece will be orientated in said spindle in a predetermined angular position as established by the setting of said orientating means.

2. A machine tool according to claim 1 including:
power means actuatable to rotate said spindle for rotating a workpiece supported therein for cooperation with a non-rotating cutter; and,
means for locking said spindle against rotation for supporting the workpiece in a fixed position so that it may be operated on by a rotating cutter.

3. A machine tool according to claim 2 including:
securing means in said work spindle operable in response to the reception of said adaptor from said transfer means to secure the adaptor in said spindle for the performance of a work operation on the workpiece carried by said adaptor.

4. A machine tool according to claim 3 including:
means operable to secure the adaptor in said set-up means.

5. A machine tool according to claim 1 including:
means for moving said set-up means between a loading position and a ready position, said loading position being convenient for loading new workpieces into said set-up means and removing completed workpieces therefrom, said ready position cooperating with said transfer means for presenting workpieces to be transferred to said tool operator for a work operation and for receiving completed workpieces transferred from said tool operator.

6. A machine tool according to claim 1 including:
a first toothed coupling member secured in said set-up means;
a second toothed coupling member secured in said work spindle; and,
a third complementary toothed coupling member secured to said adaptor for engagement with said first and second coupling members to precisely position said adaptor when it is located in said set-up means and said work spindle.

References Cited
UNITED STATES PATENTS

| | | | |
|---|---|---|---|
| 2,646,152 | 7/1953 | Retz | 29—38(.2) |
| 2,782,689 | 2/1957 | Carlsen et al. | 29—568X |
| 2,807,973 | 10/1957 | Meyer et al. | 82—2.5 |
| 3,099,873 | 8/1963 | Brainard et al. | 29—568 |
| 3,186,085 | 6/1965 | Coate | 29—568 |

LEONIDAS VLACHOS, Primary Examiner

U.S. Cl. X.R.

82—2.7; 29—568

UNITED STATES PATENT OFFICE
CERTIFICATE OF CORRECTION

Patent No.  3,550,487                     Dated   December 29, 1970

Inventor(s)  John S. Randall, et. al.

It is certified that error appears in the above-identified patent and that said Letters Patent are hereby corrected as shown below:

Column 10, line 69, "face of the cap member 147. Under t condition" should read -- block 163 and the cap 168 normally operates to -- ; line 74, "cup" should read -- cap -- . Column 32, line 22, "energizes" should read -- energized -- Column 37, line 58, "location" should read -- locating -- . Column 38, line 27, "rip" should read -- grip -- . Column 4 line 12, "offset" should read -- effect -- ; line 45, "value should read -- valve -- .

Signed and sealed this 19th day of December 1972.

(SEAL)
Attest:

EDWARD M. FLETCHER, JR.                ROBERT GOTTSCHALK
Attesting Officer                      Commissioner of Patents